United States Patent
Van Der Mark et al.

(10) Patent No.: US 7,203,152 B2
(45) Date of Patent: Apr. 10, 2007

(54) MULTI-STACK ROLLED-UP INFORMATION CARRIER

(75) Inventors: Martinus Bernardus Van Der Mark, Eindhoven (NL); Erwin Rinaldo Meinders, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 64 days.

(21) Appl. No.: 10/546,308

(22) PCT Filed: Feb. 16, 2004

(86) PCT No.: PCT/IB2004/000486

§ 371 (c)(1),
(2), (4) Date: Aug. 19, 2005

(87) PCT Pub. No.: WO2004/077414

PCT Pub. Date: Sep. 10, 2004

(65) Prior Publication Data

US 2006/0152789 A1  Jul. 13, 2006

(30) Foreign Application Priority Data

Feb. 27, 2003  (EP) ................... 03290474

(51) Int. Cl.
*G11B 7/00* (2006.01)
(52) U.S. Cl. ...................................... 369/126; 369/100
(58) Field of Classification Search .................... None
See application file for complete search history.

(56) References Cited

U.S. PATENT DOCUMENTS

| 4,939,716 A | * | 7/1990 | Petrov et al. | ............... 369/100 |
| 6,977,883 B2 | * | 12/2005 | Terao et al. | ............... 369/276 |
| 2002/0176349 A1 | * | 11/2002 | Gibson et al. | ............... 369/126 |

\* cited by examiner

*Primary Examiner*—Muhammad Edun

(57) ABSTRACT

The invention relates to an information carrier for scanning information by means of an optical beam having a wavelength. The information carrier comprises a central hole (11) and at least two information stacks (13, 14) rolled up around said hole. Each information stack comprises a first electrode, a second electrode and a material whose optical properties at the wavelength of the optical beam depend on a potential difference applied between the first and second electrodes.

20 Claims, 14 Drawing Sheets

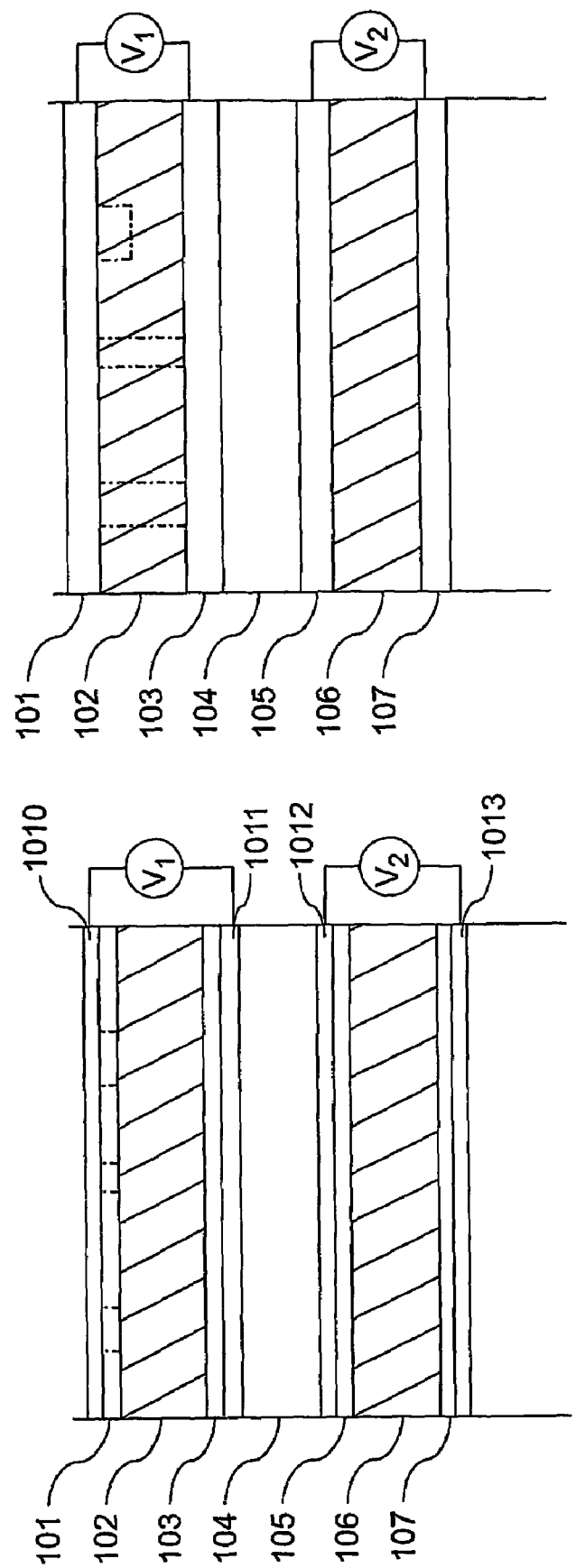

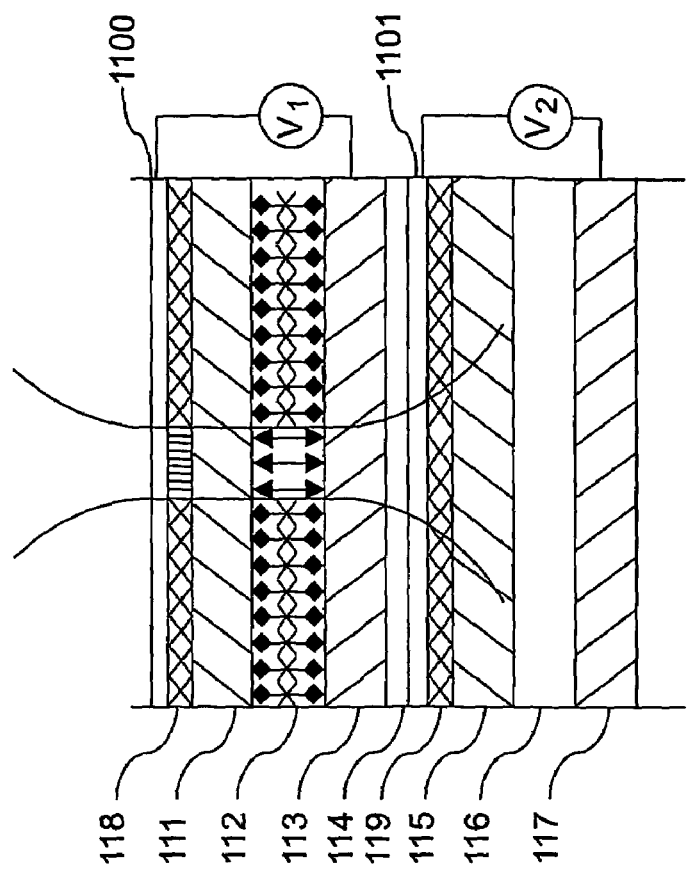
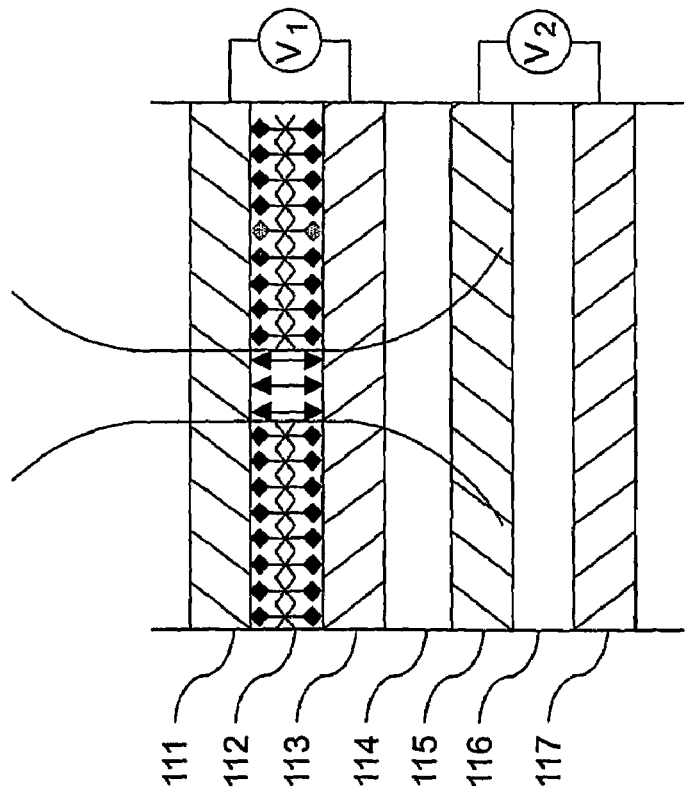

MULTI-STACK ROLLED-UP INFORMATION CARRIER

FIELD OF THE INVENTION

The present invention relates to a multi-stack optical information carrier.

The present invention also relates to a scanning device for scanning a multi-stack optical information carrier.

The present invention also relates to a method of manufacturing a multi-stack optical information carrier.

BACKGROUND OF THE INVENTION

Patent U.S. Pat. No. 6,386,458 describes a data storage medium comprising an information carrier which is rolled up in a spiral fashion and on which written information patterns are provided which can be read optically, due to local refractive index variations. This data storage medium comprises a plurality of information layers, which are read from the inside by means of an optical beam arranged in the inside of the winding. Such a data storage medium is compact and can, in theory, comprise a large number of information layers.

However, the number of information layers in such an information carrier is limited. First, because the luminous intensity of the optical beam decreases with each additional layer crossed. Actually, when the optical beam has to pass many layers for interacting with a layer, interaction takes also place in the layers that are not read out, reducing the intensity of the optical beam. Additionally, the local refractive index variations of the written information patterns in the layers that are not read out cause refraction and scattering of the traversing light-beam, leading to deteriorated writing and reading.

Hence, such a rolled up information carrier is not suitable for multi-layer information carriers, in particular for information carriers comprising more than three layers.

SUMMARY OF THE INVENTION

It is an object of the invention to provide an information carrier, which is highly compact and can comprise an increased number of layers.

To this end, the invention proposes an information carrier for scanning information by means of an optical beam having a wavelength, said information carrier comprising a central hole and at least two information stacks rolled up around said hole, wherein each information stack comprises a first electrode, a second electrode and a material whose optical properties at the wavelength of the optical beam depend on a potential difference applied between the first and second electrodes.

According to the invention, the information carrier comprises a plurality of information stacks, which are rolled up around a central hole. This makes this information carrier particularly compact. Moreover, information can be read from the inside of the information carrier, by means of an optical system mounted with rotation possibility in the central hole of the information carrier. Compared with a conventional optical disc apparatus, such as a CD reader, in which the optical disc rotates during scanning, the rotational speed of the optical system can be higher than the rotational speed of a conventional optical disc, thus increasing the data transfer rate.

Furthermore, the information layers comprise a material, whose optical properties can be switched by application of a potential difference. Hence, by application of suitable potential differences to the stacks, it is possible to scan one layer having optical properties suitable for interacting with the optical beam, whereas the optical properties of the other layers are chosen such that the interactions between these non-addressed layers and the optical beam are reduced. As a consequence, the number of layers can be increased.

In a first embodiment of the invention, the information carrier comprises an electrolyte layer between the first and the second electrode, the first electrode being an information layer comprising an electrochromic material, the second electrode being a counter electrode.

Advantageously, an information layer serves as counter electrode for another information layer. This reduces the number of layers of the stacks. Hence, the information carrier is less bulky, and the manufacturing process of the information carrier is simplified.

Preferably, the electrochromic material has an ability to take up or release electrons, which ability can be locally reduced by means of the optical beam in order to write information on the information layer. Information can thus be written on the information carrier by a user.

With particular preference, the electrolyte layer has a temperature-dependent mobility threshold. According to this embodiment, information can be written by a user, then erased and rewritten on the information carrier.

Advantageously, the information layer further comprises a thermochromic material having temperature-dependent optical properties at the wavelength of the optical beam. When the electrolyte layer has a temperature-dependent mobility threshold, allowing rewriting of information on the information carrier, the layers of the information carrier all have the same optical properties during read-out of the information. Hence, the non-addressed layers interact with the optical beam, which reduces the possible number of layers. The use of a thermochromic material reduces the interaction between the optical beam and the layers, because the thermochromic material improves the interaction between the optical beam and the addressed layer.

Preferably, an information stack further comprises a photoconductive layer for allowing a transfer of electrons in the information layer when illuminated at the wavelength of the optical beam. When the electrolyte layer has a temperature-dependent mobility threshold, allowing the writing of marks on the information carrier, the diffusion of heat in the electrolyte layer during writing of information makes the marks relatively large. The use of a photoconductive layer reduces the size of the written marks, thus increasing the data capacity of the information carrier.

The information layers may further comprise a fluorescent material. Read-out of information is performed by detection of light emitted by fluorescence. As a consequence, the number of layers may be increased even more.

Advantageously, the fluorescent material has an ability to emit light by fluorescence, which ability can be locally reduced by means of the optical beam in order to write information on the information layer. According to this embodiment, information can be written by a user on the information carrier.

In a second embodiment of the invention, the information carrier comprises an information layer between the first and second electrodes, wherein the information layer comprises molecules which can be rotated when a suitable potential difference is applied between the first and second electrodes.

Advantageously, said molecules are liquid crystal molecules which can be rotated when subjected to an electric field created by the potential difference applied between the first and second electrodes.

Preferably, said molecules comprise a charged substituent which can be rotated when subjected to a current created by the potential difference applied between the first and second electrodes.

With particular preference, the first electrode has an electrical conductance which can be locally reduced by means of an optical beam in order to write information on the information layer. Information can thus be written on the information carrier by a user.

Preferably, the information stack further comprises a thermal insulation layer between the first electrode and the information layer. In this case, writing of information without degrading the information layer is possible, even if the information layer has a decomposition temperature which is lower than or equal to the temperature at which the electrical conductance of the first electrode is reduced. If this insulation layer is an electrically insulating layer, the embodiment based on molecules that rotate under the influence of an electric field may be used. If an electrically conducting layer is used, the embodiment based on molecules that rotate under the influence of an electrical current may also be used.

Advantageously, the information layer can be locally degraded by means of an optical beam in order to write information on the information layer. The information layer may be for example annealed, altered, molten, fixed or photochemically deteriorated by means of the optical beam in order to write information, such that a further orientation change of the molecules of the information layer is no longer possible. The degraded parts of the layer remain essentially transparent, whatever the potential difference applied between the first and second electrodes. According to this embodiment, information can be written on the information carrier by a user in that certain areas of the information stack are disabled from changing their optical properties.

Preferably, the information layer comprises a matrix comprising two types of surface-charged colloidal particles, one with negative charge and one with positive charge, said surface-charged colloidal particles comprising liquid crystal molecules, said matrix having a viscosity which can be locally reduced by means of an optical beam in order to write information on the information layer. According to this embodiment, information can be written by a user, then erased and rewritten on the information carrier.

The invention also relates to an optical scanning device for scanning an information carrier by means of an optical beam having a wavelength, said information carrier comprising a central hole and at least two information stacks rolled up around said hole, wherein each information stack comprises a first electrode, a second electrode and a material whose optical properties at the wavelength of the optical beam depend on a potential difference applied between the first and second electrodes, said optical scanning device comprising means for receiving said information carrier, means for generating the optical beam, means for applying a potential difference between the information layer and the counter electrode of an information stack, means for focusing said optical beam on an information layer, said focusing means being mounted with rotation possibility inside said receiving means.

Advantageously, said focusing means are mounted with translation possibility inside said receiving means. The information carrier may thus be completely fixed in the optical scanning device. The power needed for translating the focusing means may be lower than the power needed for translating the information carrier. The power needed for rotating the focusing means is lower than the power which would be required to rotate the information carrier.

The invention also relates to a method of manufacturing an information carrier, said method comprising the steps of manufacturing an information strip comprising at least one electrode and a material whose optical properties at the wavelength of the optical beam depend on a potential difference applied between two electrodes, winding said information strip around a transparent hollow element and cutting the electrode at each turn of the winding step.

Advantageously, this method further comprises a step of writing information on the information strip. A ROM information carrier can thus be obtained in a continuous process. Furthermore, this writing step may also be used to make a pre-grooved strip as required for write-once (WORM) and rewritable (RW) information carriers.

These and other aspects of the invention will be apparent from and will be elucidated with reference to the embodiments described hereinafter.

BRIEF DESCRIPTION OF THE DRAWINGS

The invention will now be described in more detail, by way of example, with reference to the accompanying drawings, in which:

FIGS. 10a, 10b, 10c and 10d show a first, a second, a third and a fourth WORM information carrier in accordance with a second embodiment of the invention;

FIGS. 11a and 11b show a first and a second RW information carrier in accordance with a first embodiment of the invention;

DETAILED DESCRIPTION OF THE INVENTION

Figure 1:
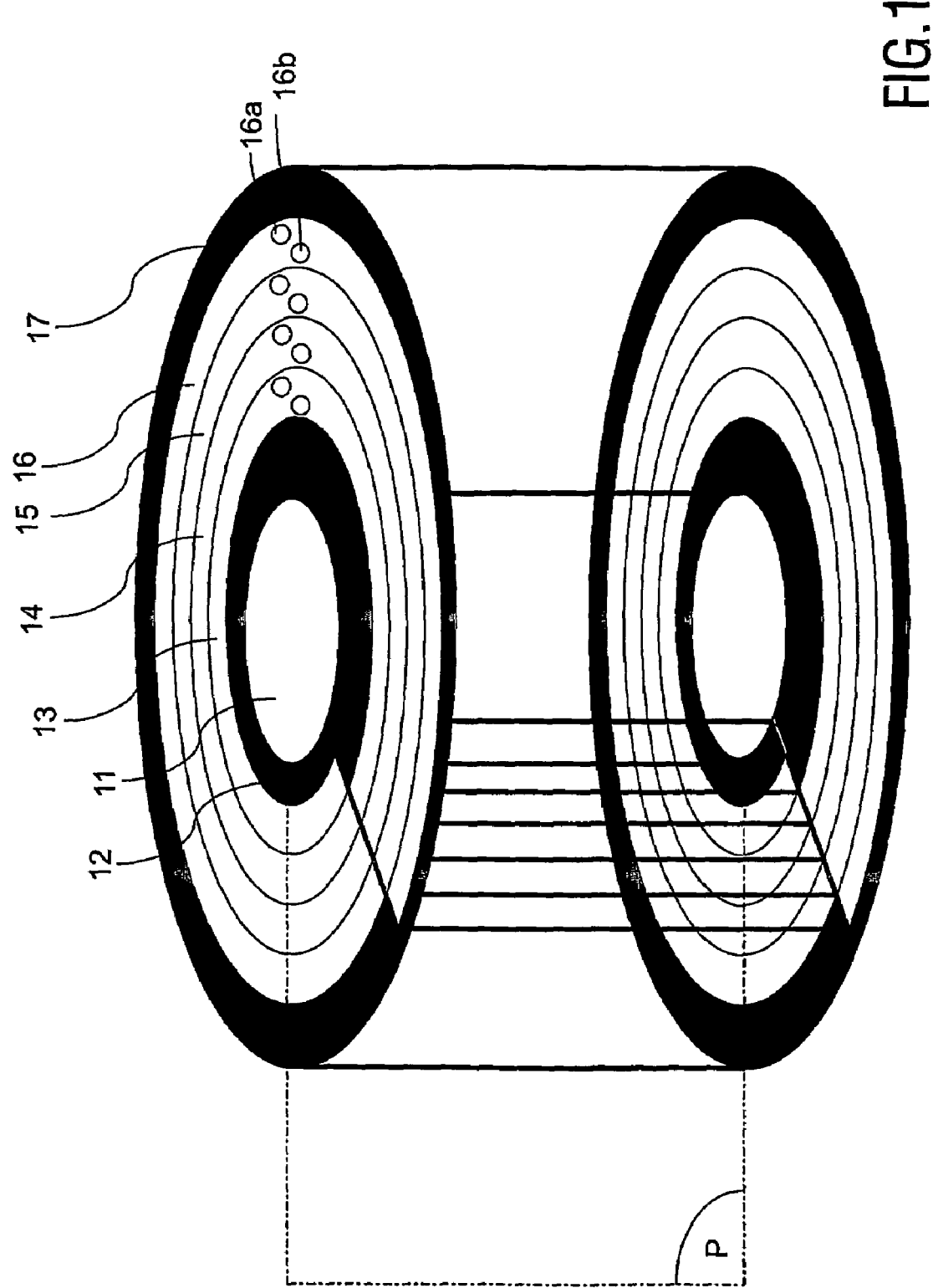
FIG. 1 shows an information carrier in accordance with the invention.

An information carrier in accordance with the invention is depicted in FIG. 1. This information carrier comprises a transparent hollow element 12 comprising a central hole 11, a first, a second, a third and a fourth information stack 13, 14, 15 and 16, and a protective cover 17. The information carrier further comprises contacts, such as contacts 16a and 16b.

It should be noted that an information stack may be a combination of two information stacks of the information carrier represented in FIG. 1, as will be described in more detail in FIG. 6a for example. For example, the first and second information stacks 13 and 14 may form an information stack.

In the example of FIG. 1, the information carrier comprises two contacts per information stack. For example, contact 16a is connected to a first electrode of the fourth information stack 16 and contact 16b is connected to a second electrode of the fourth information stack 16. If an information stack is a combination between two information stacks shown in FIG. 1, the information carrier may comprise only one contact per information stack shown in FIG. 1.

The information carrier of FIG. 1 is intended to be scanned by an optical beam, which has a wavelength 1. In the example of FIG. 1, each information stack comprises a first electrode, a second electrode and a material whose optical properties at the wavelength of the optical beam depend on a potential difference applied between the first and second electrodes. The hollow element 12 is chosen so as to be transparent at the wavelength 1. By application of a suitable potential differences between the suitable contacts, it is possible to scan information in an information stack, which scanning is not perturbed by the presence of the other information stacks. Actually, depending on the potential difference applied to an information stack, the material of this information stack may be absorbent or transparent at the wavelength 1. Hence, in order to scan the fourth information stack 16 for example, the first, second and third information stacks 13, 14 and 15, can be made transparent at the wavelength 1, whereas the material of the fourth information stack 16 is made absorbent at the wavelength 1. If information has been written in this fourth information stack 16 by means of said material, information can be read from the fourth information stack 16, without this read-out being perturbed by the first, second and third information stacks 13, 14 and 15.

It should be noted that an information carrier in accordance with the invention may comprise more than four information stacks. Actually, as the scanning of an information stack is not perturbed by the other information stacks, such an information carrier may comprise a relatively high number of information stacks. For example, an information carrier in accordance with the invention may comprise 10, 20 or up to 100 or more information stacks.

It should also be noted that the thickness of the information stacks shown in FIG. 1 does not correspond to reality. Actually, the thickness of an information stack may be several micrometers, typically 40 micrometers, preferably less than 10 micrometers, most preferably less than 1 micrometer, whereas the diameter of the central hole may be about one centimetre. Hence, such an information carrier is relatively compact, even if the number of information stacks is high.

It should also be noted that information carriers in accordance with the invention may have various shapes. For example, the information carrier may be elliptically shaped, or have a parallelepipedic shape. The overall shape of the data storage medium may also be a hollow rectangle. The readout of data then preferably follows a meandering or zig-zag path but a helical path is also possible.

Figure 2:
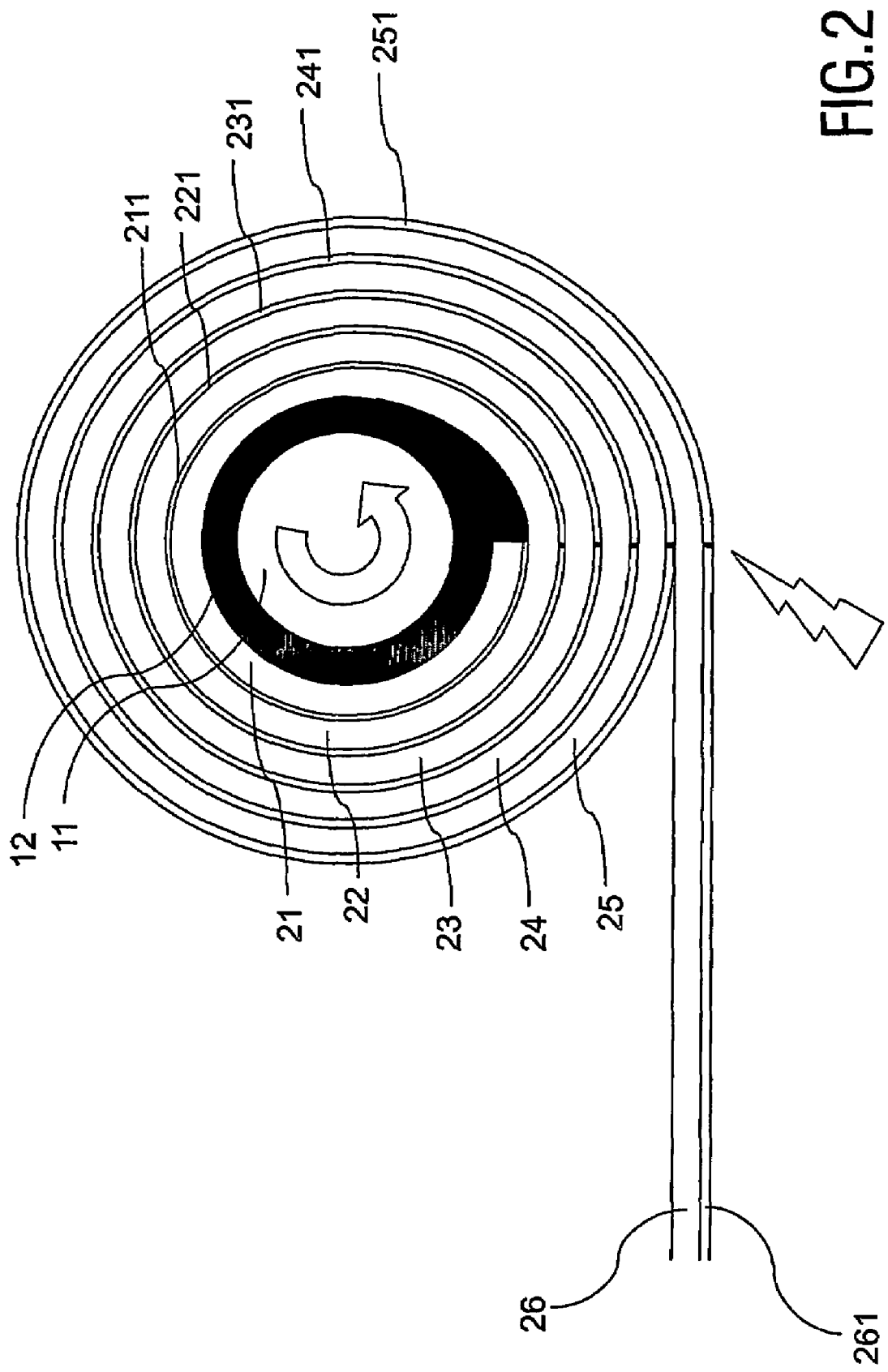
FIG. 2 illustrates a method a manufacturing an information carrier in accordance with the invention.

FIG. 2 illustrates a method of manufacturing an information carrier in accordance with the invention. FIG. 2 corresponds to a top view of the information carrier of FIG. 1, during its manufacturing process. The manufacture consists in making an information strip comprising at least one electrode, such as electrode 261 and a material whose optical properties at the wavelength of the optical beam depend on a potential difference applied between two electrodes. The information strip further comprises an additional layer, such as additional layer 26, which at least comprises an adhesive against unwanted unwinding.

The nature of the information strip depends on the material used, whose optical properties can be switched by means of a potential difference, as well as on the design of the information stacks. Many examples of information stacks and structures of the information strip are described in more details with reference to the following Figures.

Once the information strip has been manufactured, it is rolled up around the transparent hollow element 12. In the example of FIG. 2, the information strip is rolled up in a spiral fashion. At each turn, the electrode of the information strip is cut, so that a plurality of electrodes are obtained, which are electrically insulated from each other. In this example, the information carrier comprises five electrodes 211, 221, 231, 241 and 251. The information strip may comprise other electrodes, which are also cut at each turn of the winding.

The electrodes may also be cut before winding, so as to obtain a plurality of electrodes in the information strip before winding. In this case, the length of an electrode in the information strip corresponds to the length of a turn of the information carrier.

Other layers of the information strip, such as the additional layer 26, may also be cut before or during winding. In the example of FIG. 2, the information carrier comprises five additional layers 21, 22, 23, 24 and 25. In this example, the information carrier comprises five information stacks, each comprising an electrode, such as electrode 211, and an additional layer, such as additional layer 21.

At the end of the manufacturing process, a protective layer is rolled up or deposited around the information stacks. Contacts are then added on the top surface of the information carrier, which contacts are electrically connected to the associated electrodes of the information stacks. These contacts may also be added before or during winding. The information carrier may comprise further contacts on its bottom surface. This allows the stacking together of a plurality of information carriers in accordance with the invention, in that the contacts of the top surface of one information carrier are aligned with the contacts of the bottom surface of another information carrier.

It is important to note that the information strip may be manufactured during winding. For example, in a case where information is written on the information strip by embossing, the information strip may be embossed while an already embossed part of the information strip is being rolled up. As a consequence, the manufacturing process is continuous, thus reducing the time of manufacture of an information carrier in accordance with the invention. Instead of embossing the information, printing, pressing or other methods of data replication such as burning or photo-chemical deterioration, are possible.

Figure 3B:
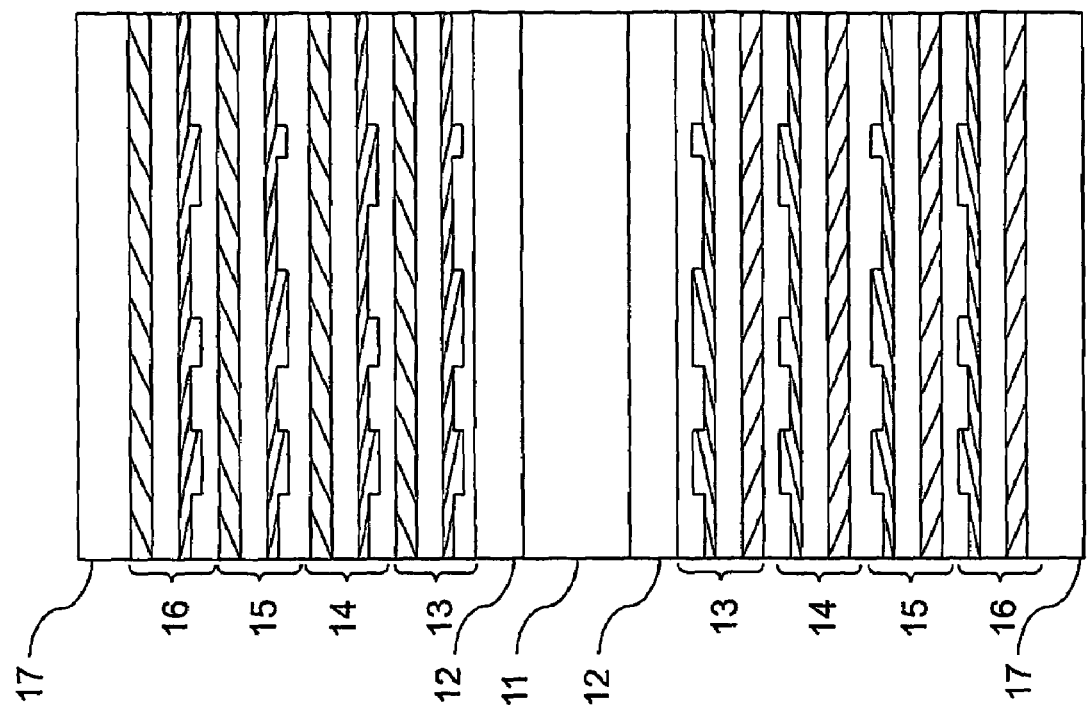
FIG. 3a is a detailed view of a first ROM information carrier in accordance with a first embodiment of the invention and FIG. 3b shows a complete view of this first ROM information carrier.
Figure 3A:
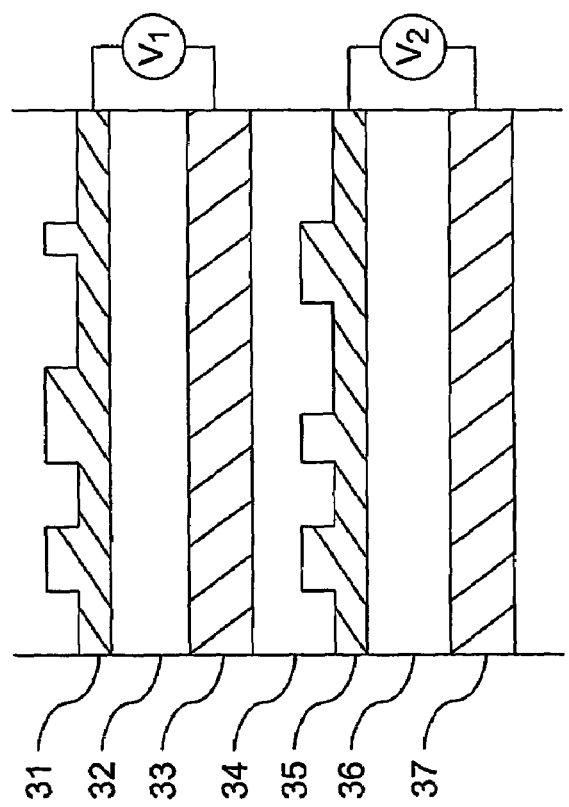

FIG. 3a is a detailed view of a first ROM (Read Only Memory) information carrier in accordance with a first embodiment of the invention. FIG. 3a corresponds to a view in the plane P of FIG. 1, where only two information stacks, such as the first and second information stacks 13 and 14 of FIG. 1, are shown.

This information carrier comprises a first information layer 31, a first electrolyte layer 32, a first counter electrode 33, a spacer layer 34, a second information layer 35, a second electrolyte layer 36 and a second counter electrode 37. The first information layer 31, the first electrolyte layer 32 and the first counter electrode 33 form a first information stack, such as the first information stack 13, while the second information layer 35, the second electrolyte layer 36 and the second counter electrode 37 form a second information stack, such as the second information stack 14. The two information stacks are separated by the spacer layer 34. The spacer layer 34 is comprises an adhesive material.

In this example, the information strip rolled up so as to obtain this information carrier comprises an information layer, an electrolyte layer, a counter electrode and a spacer layer.

The first information layer 31 is connected to a first contact, the first counter electrode 33 to a second contact, the second information layer 35 to a third contact and the second counter electrode 37 to a fourth contact.

This information carrier is a ROM (Read Only Memory) information carrier, which means that a user cannot record information on this carrier. The information is recorded during the manufacturing process and cannot be erased. The information layers 31 and 35 comprise pits and lands, which are obtained by means of conventional techniques, such as embossing and printing.

This information carrier is intended to be scanned by an optical beam, which has a wavelength 1. The first and second electrolyte layers 32 and 36, the first and second counter electrodes 33 and 37 as well as the spacer layer 34, are chosen to be transparent at the wavelength 1, or at least to have a very small absorption at this wavelength, in order not to interact with the optical beam.

The first and second information layers 31 and 35 comprise an electrochromic material. An electrochromic material is a material having optical properties, which can change as a result of electron uptake or loss. Electrochromic materials are known to those skilled in the art. For example, the publication "Electrochromism: Fundamentals and Applications", by Paul M. S. Monk et al. and published in 1995, describes the properties of electrochromic materials. Preferably, the electrochromic materials used in an information carrier in accordance with the invention are thiophene derivatives, such as poly(3,4-ethylenedioxythiophene), also called PEDT or PEDOT and described, for example, in "Poly(3,4-ethylenedioxythiophene) and Its Derivatives: Past, Present and Future", by L. Bert Goenendaal et al., published in Advanced Materials 2000, 12, No. 7.

In the example of FIG. 3, the electrochromic material of the first and second information layers 31 and 35 is the same, and has a reduced state and an oxidized state. The electrochromic material is chosen to have a high absorption and reflection at the wavelength 1 when it is in its reduced state, and a low absorption and reflection at the wavelength 1 when it is in its oxidized state. Of course, another electrochromic material could be used, which has a high absorption and reflection at the wavelength 1 when it is in its oxidized state, and a low absorption and reflection at the wavelength 1 when it is in its reduced state.

When the first information layer 31 is scanned for reading information from this first information layer 31, a potential difference V1 is applied between the first information layer 31 and the first counter electrode 33, i.e. between the first and second contacts, the first information layer 31 being at a higher potential than the first counter electrode 33. A current then flows from the first information layer 31 to the first counter electrode 33, whereas electrons are transported from the first counter electrode 33 to the first information layer 31. Electrons are absorbed by the electrochromic material, which becomes reduced. For reasons of electrical neutrality, positive ions from the first electrolyte layer 32 are absorbed by the first information layer 31 or negative ions are expelled by the first information layer 31, and negative ions from the first electrolyte 32 are absorbed by the first counter electrode 33 or positive ions are expelled by the first counter electrode 33. Hence, the first counter electrode is an ion-accepting and donating electrode. The potential difference V1 is chosen such that, when applied, the absorption and reflection of the first information layer 31 become relatively high at the wavelength 1. The required potential difference V1 depends on the wavelength 1, the electrochromic material, the electrolyte, the counter electrode, and an optional additional electrode in the information stack.

Then, once the absorption and reflection of the first information layer 31 have become high, the potential difference can be cut. Actually, the used electrochromic materials display bistability, which means that their optical properties persist when no potential difference is applied. As the absorption and reflection of the first information layer 31 are high, information can be read from this information layer by conventional read-out techniques, such as the phase difference read-out principle used, for example, for read-out of CD-ROM.

The electrolyte layer of an information stack comprises an electrolyte, which should be able to provide ions to the information layer and the counter electrode of this information stack. Preferably, solid or elastomeric polymeric electrolytes are used in an information carrier in accordance with the invention. These electrolytes consist of polymers comprising ion-labile groups, or consist of polymers with dissolved salts. Examples of polymers with dissolved salts are crosslinked polyethers, polyethylene oxide, polyvinyl alcohol or polymethyl methacrylate, with salts such as lithium chlorate, triflic acid or phosphoric acid.

Once the information of the first information layer 31 has been read, the second information layer 35 is scanned. First, the first information layer 31 is made transparent in that a potential difference −V1 is applied between the first information layer 31 and the first counter electrode 33, which is a reverse potential difference compared with V1. As a consequence, the electrochromic material of the first information layer 31 becomes oxidized, in which state it has a low absorption and reflection at the wavelength 1. The potential difference −V1 can then be cut, because of the bistability of the electrochromic material of the first information layer 31. Then, the second information layer 35 is made absorbent, in that a potential difference V2 is applied between the second information layer 35 and the second counter electrode 37. In this example, V2 is equal to V1, because the first and second information stacks comprise the same electrochromic material. If different electrochromic materials are used in the first and second information layers 31 and 35, V2 may differ from V1. Once the second information layer 35 has become absorbent, the potential difference V2 is cut, because the used electrochromic material is bistable.

Once the absorption of the second information layer 35 is high, information can be read from this information layer. The first information layer 31 does not perturb the read-out of information, because the first information layer 31 has been made transparent. As a consequence, it is possible to address only one information layer, while the rest of the information carrier is transparent or has a low absorption and reflection. The desired layer is addressed in that the suitable potential differences are applied between the information layers and the counter electrodes of the different information stacks.

An information carrier in accordance with the invention, comprising the abovementioned layers, may be manufactured by conventional techniques, such as embossing, moulding, photolithographic techniques, micro-contact printing or vapour deposition.

An information carrier in accordance with the invention may comprise more than two information stacks. For example, an information carrier in accordance with the invention may comprise 10, 20 or up to 100 or more information stacks. For example, an information carrier in accordance with the invention, which comprises 4 information stacks, is depicted in FIG. 3b. FIG. 3b corresponds to a complete view in the plane P of the information carrier of FIG. 1.

Figure 4:
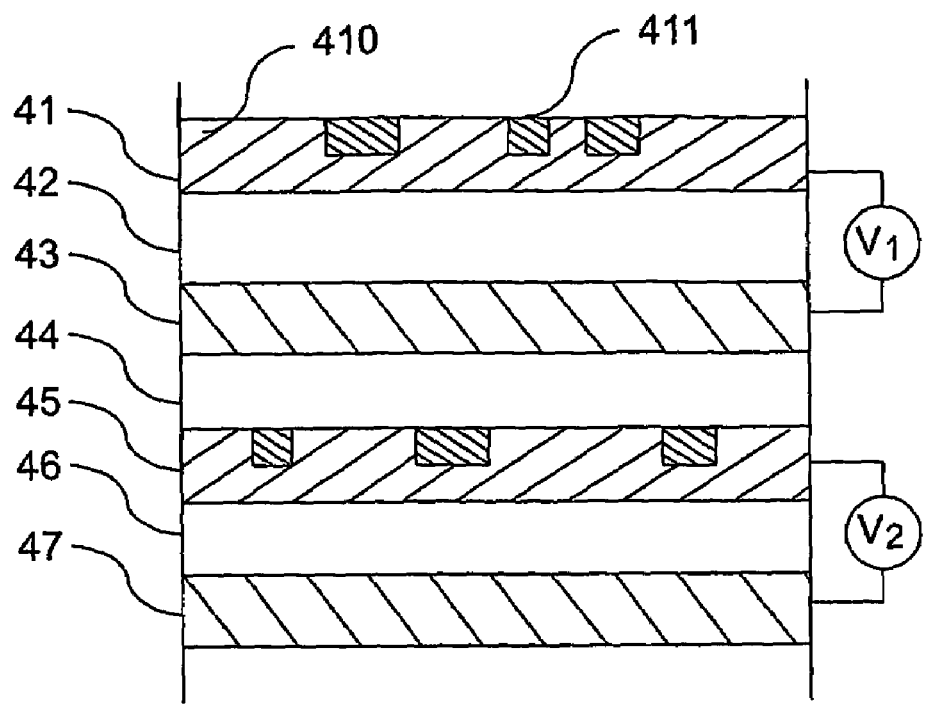
FIG. 4 shows a detailed view of a second ROM information carrier in accordance with a first embodiment of the invention.

FIG. 4 is a detailed view of a second ROM information carrier in accordance with a first embodiment of the invention. FIG. 4 also corresponds to a view in the plane P of FIG. 1, where only two information stacks, such as the first and second information stacks 13 and 14 of FIG. 1, are shown.

Such an information carrier comprises a first information layer 41, a first electrolyte layer 42, a first counter electrode 43, a spacer layer 44, a second information layer 45, a second electrolyte layer 46 and a second counter electrode 47. The first information layer 41, the first electrolyte layer 42 and the first counter electrode 43 form a first information stack, the second information layer 45, the second electrolyte layer 46 and the second counter electrode 47 form a second information stack. The two information stacks are separated by the spacer layer 44.

An information layer comprises pits and lands, the pits being filled by a fluorescent material, the lands comprising an electrochromic material. For example, the first information layer 41 comprises lands 410, which comprise an electrochromic material, and pits 411, which comprise a fluorescent material.

The information strip rolled up so as to obtain this information carrier comprises an information layer, an electrolyte layer, a counter electrode and a spacer layer. Such an information strip is manufactured by conventional techniques, such as those described in patent WO 98/50914.

For example, an electrolyte layer is deposited on a counter electrode. Then, a layer comprising the electrochromic material is deposited on the electrolyte layer. A stamper comprising a plurality of convexities is applied to this layer comprising the electrochromic material. This results in a pattern on the surface of this layer, said pattern matching the convexities of the stamper. Then, a layer comprising the fluorescent material is deposited on the surface of the patterned layer. This layer comprising the fluorescent material is chosen so as to have good adhesion properties to the patterned layer. A portion of this layer penetrates into the pits of the patterned layer and another portion remains on the surface of the lands of the patterned layer. Said other portion is then eliminated by means of a suitable solvent. The information layer is thus obtained, which comprises lands comprising the electrochromic material, and pits filled with the fluorescent material. These pits filled with the fluorescent material are fluorescent cells, which comprise the information recorded on the information layer. Such an information strip may also be manufactured by means of an injection molding technique, as described in WO 98/50914.

This information carrier is intended to be scanned by an optical beam, which has a wavelength 11. The first and second electrolyte layers 42 and 46, the first and second counter electrodes 43 and 47, the spacer layer 44, as well as the fluorescent material are chosen so as to be transparent at the wavelength 11.

When the first information layer 41 is scanned for reading information from this first information layer 41, a potential difference V1 is applied between the first information layer 41 and the first counter electrode 43. Electrons are absorbed by the electrochromic material of the first information layer 41, which becomes reduced. The potential difference V1 is chosen such that, when applied, the absorption and reflection of the electrochromic material of the first information layer 41 become relatively high at the wavelength 11.

As the absorption and reflection of the first information layer 41 are high, this first information layer 41 absorbs energy from the optical beam focused on this information layer. When the optical beam is focused on a pit of the first information layer 41, the absorbed energy is converted into a fluorescence signal by the fluorescent material comprised in this pit. This fluorescence signal is then detected by conventional techniques. Hence, information is read from the first information layer 41. Examples of such fluorescent materials are quinoline, acridine, indole, coumarin derivatives, such as 2,3,5,6-1H,4H-tetrahydro-9-acetylquinolizino-[9,9a,1-gh]-coumarin and 3-(2'-N-methylbenzimidazolyl)-7-N,N-diethylaminocoumarin, and pyrromethene derivatives. These fluorescent materials may be applied as such, or be dispersed in a supporting matrix material, for example of a polymeric nature, with the optional aid of complexation or adsorption to a binder.

Once the information of the first information layer 41 has been read, the second information layer is scanned. First, the first information layer 41 is made transparent in that a potential difference −V1 is applied between the first information layer 41 and the first counter electrode 43. As a consequence, the electrochromic material of the first information layer 41 becomes oxidized, in which state it has a low absorption at the wavelength 11. Then, the second information layer 45 is made absorbent, in that a potential difference V2 is applied between the second information layer 45 and the second counter electrode 47. In this example, V2 is equal to V1.

Once the absorption of the second information layer 45 is high, this second information layer 45 can absorb energy from the optical beam focused on this second information layer 45. When the optical beam is focused on a pit of the second information layer 45, the absorbed energy is converted into a fluorescence signal by the fluorescent material comprised in this pit. This fluorescence signal is then detected, and information is thus read from the second information layer 45.

Due to the so-called Stokes-shift, the fluorescence signal has a wavelength 12. The fluorescent material is chosen so as to be transparent at the wavelength 12, so that the detected fluorescence signal is not perturbed by the fluorescent material of the first information layer 41.

The first information layer 41 does not perturb the readout of information recorded on the second information layer 45, because the electrochromic material of the first information layer 41 has been made transparent at the wavelength 11, as explained hereinbefore. Hence, the optical beam at wavelength 11 traversing the first information layer 41 does not interact with the lands of the first information layer 41, and does not interact with the pits of the first information layer 41 either, because the fluorescent material is chosen to be transparent at the wavelength 11. Moreover, the electrochromic material of the first information layer 41 is chosen to be transparent at the wavelength 12, so that it does not interact with the fluorescence signal at wavelength 12.

As a consequence, it is possible to address only one information layer, while the rest of the information carrier is transparent or has a low absorption at the wavelength 11 and at the wavelength 12. The desired layer is addressed in that the suitable potential differences are applied between the information layers and the counter electrodes of the respective information stacks.

Figure 5A:
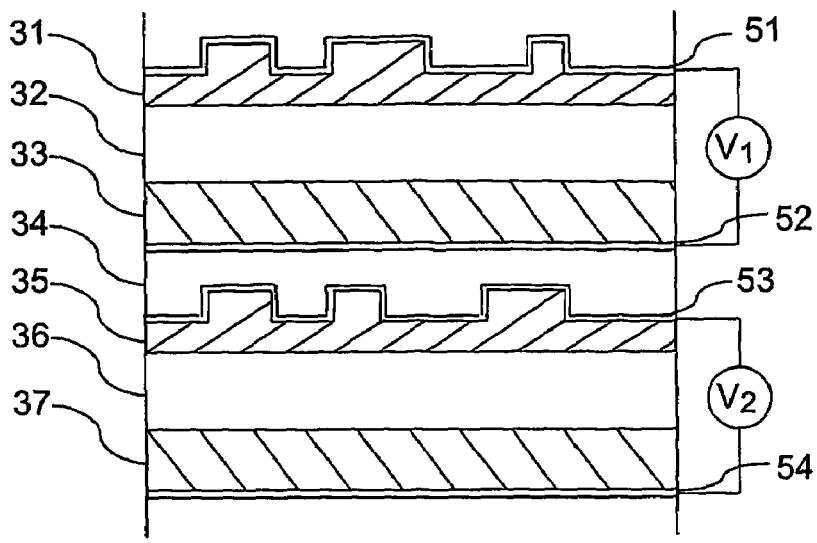
FIGS. 5a, 5b, and 5c show a third, a fourth and a fifth information carrier in accordance with a first embodiment of the invention.
Figure 5B:
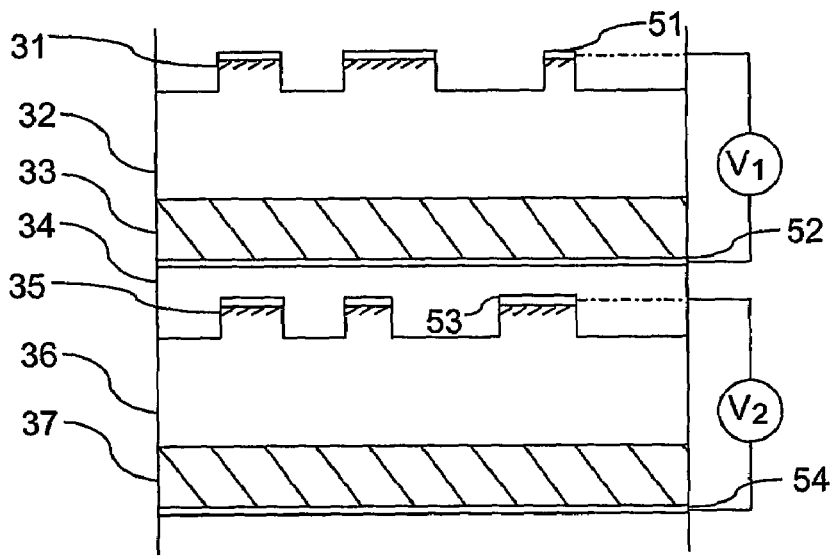
Figure 5C:
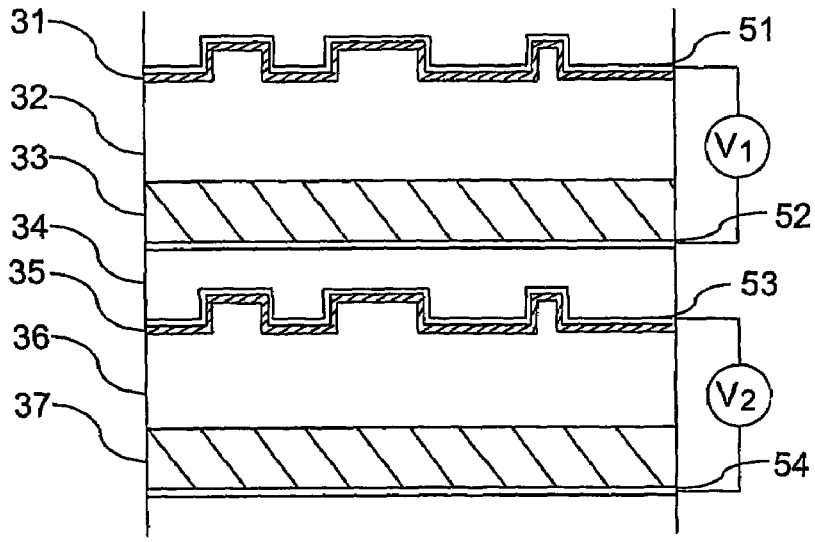

FIGS. 5a, 5b and 5c show a second, a third and a fourth ROM information carrier in accordance with a first embodiment of the invention. In these Figures, numbers identical to numbers of FIG. 3a stand for the same entities. These information carriers comprise a first and a second information stack. The first information stack comprises a first transparent electrode 51 and a second transparent electrode 52. The second information stack comprises a third transparent electrode 53 and a fourth transparent electrode 54. The first, second, third and fourth transparent electrodes 51 to 54 are chosen to be transparent at the wavelength 1.

The information strip rolled up so as to obtain the information carrier of FIG. 2a comprises a first transparent electrode, a counter electrode, an electrolyte layer, an information layer comprising an electrochromic material, a second transparent electrode and a spacer layer. The information layer of the information strip is patterned by conventional techniques, such as embossing. The second transparent electrode is deposited on the information layer by conventional techniques, such as vapour deposition.

In order to switch the first information layer 31 from a transparent state to an absorbent state at the wavelength 1, a suitable potential difference is applied between the first and second transparent electrodes 51 and 52. This potential difference depends, inter alia, on the nature of the first and second transparent electrodes 51 and 52. Examples of materials which may be used for the first and second transparent electrodes 51 and 52 are ITO (Indium Tin Oxide), PPV (poly(phenylenevinylene)), PEDOT (poly(3,4-ethylenedioxythiophene) and other polythiophene derivatives. In order to switch the first information layer 31 from an absorbent state to a transparent state at the wavelength 1, a reverse potential difference is applied between the first and second transparent electrodes 51 and 52. This description also applies to the second information stack.

The information strip is rolled up so as to obtain the information carrier of FIG. 5b comprises a first transparent electrode, a counter electrode, an electrolyte layer, an information layer comprising an electrochromic material, a second transparent electrode and a spacer layer. The electrolyte layer is patterned, and the information layer, comprising electrochromic material, is deposited on the lands of the electrolyte layer, by conventional techniques, such as offset printing. The second electrode is deposited on the information layer. The information layers 31 and 35 are continuous layers, as the only discontinuities are caused by isolated pits. The potential differences are applied between the first and second electrodes 51 and 52, and the third and fourth electrodes 53 and 54, respectively.

The information strip rolled up so as to obtain the information carrier of FIG. 5c comprises a first transparent electrode, a counter electrode, an electrolyte layer, an information layer comprising an electrochromic material, a second transparent electrode and a spacer layer. The electrolyte layer is patterned, and the information layer, comprising electrochromic material, is deposited on the lands of the electrolyte layer, by conventional techniques, such as vapour deposition. The second transparent electrode is deposited on the information layer. The potential differences are applied between the first and second transparent electrodes 51 and 52, and the third and fourth transparent electrodes 53 and 54, respectively.

It should be noted that such additional transparent electrodes may be used in an information carrier in which the information layers comprise an electrochromic material and a fluorescent material, such as the information carrier of FIG. 4.

Figure 6A:
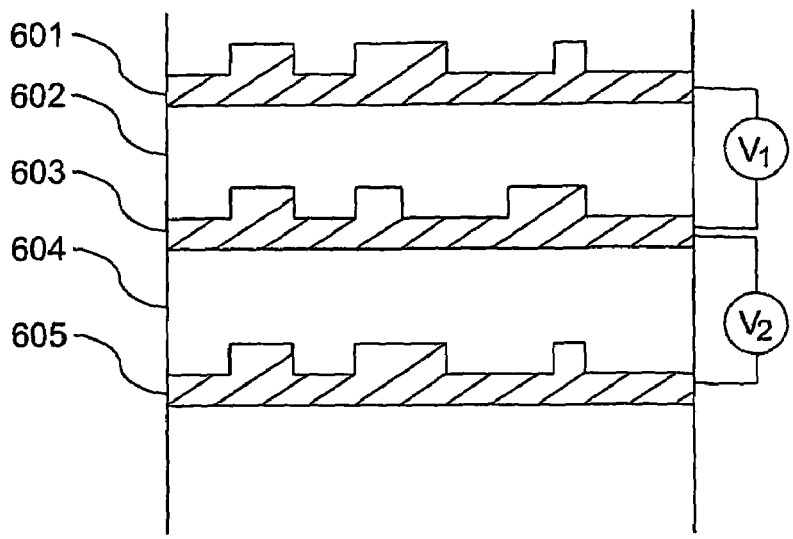
FIGS. 6a, 6b and 6c show a first, a second and a third ROM information carrier in accordance with an advantageous embodiment of the invention.

FIG. 6a shows a first ROM information carrier, wherein an information layer serves as counter electrode for another information layer. This information carrier comprises a first, a second and a third information layer 601, 603 and 605, and a first and a second electrolyte layer 602 and 604.

The information strip rolled up so as to obtain the information carrier of FIG. 6a comprises an information layer and an electrolyte layer. The electrolyte layer comprises an adhesive material.

The first information layer 601, the first electrolyte layer 602 and the second information layer 603 form a first information stack. The second information layer 603, the second electrolyte layer 604 and the third information layer 605 form a second information stack. The first and second information stacks thus have two information layers and two counter electrodes. As a consequence, an information stack does not correspond to a part of the information strip corresponding to a single turn of the winding process, but is the combination of two parts of the information strip each corresponding to a single turn of the winding process. This means that the first information stack of FIG. 6a is a combination of the first and second information stacks 13 and 14 of FIG. 1, and the second information stack of FIG. 6a is a combination of the second and third information stacks 14 and 15 of FIG. 1.

In the first information stack of FIG. 6a, the second information layer 603 serves as counter electrode for the first information layer 601, and the first information layer 601 serves as counter electrode for the second information layer 603. Actually, the first and second information layers 601 and 603 comprise electrochromic materials, and are thus ion-accepting and donating electrodes. In the second information stack, the third information layer 605 serves as counter electrode for the second information layer 603, and the second information layer 603 serves as counter electrode for the third information layer 605.

In order to address the first information layer 601, the first information layer 601 is made absorbent in that a suitable potential difference V1 is applied between the first information layer 601 and the second information layer 603. Then, in order to address the second information layer 603, the first information layer 601 is made transparent in that a reverse potential difference −V1 is applied between the first information layer 601 and the second information layer 603. As a consequence, the second information layer 603 becomes reduced, and hence becomes absorbent at the wavelength 1. Hence, the second information layer 603 is addressed and can be scanned.

In order to address the third information layer 605, a potential difference V2 is applied between the second information layer 603 and the third information layer 605. This potential difference V2 is equal to −V1, as the electrochromic materials in the information layers 601, 603 and 605 are the same. The third information layer 605 is reduced and becomes absorbent at the wavelength 1, and the second information layer 603 is oxidized and becomes transparent at the wavelength 1. As a consequence, only the third information layer 605 is absorbent at the wavelength 1, so that the first and second information layers 601 and 603 do not perturb the scanning of the third information layer 605.

Figure 6B:
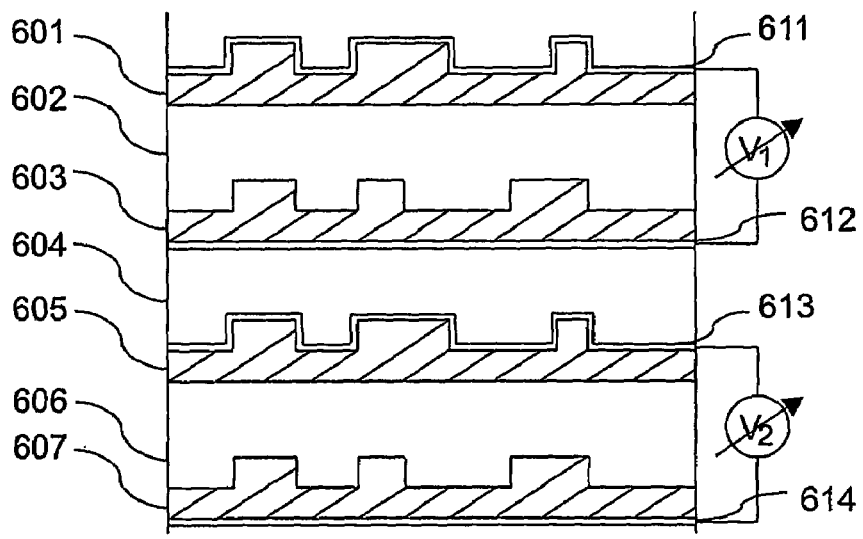

FIG. 6*b* shows a second ROM information carrier, wherein an information layer serves as counter electrode for another information layer. This information carrier comprises a first, a second, a third and a fourth information layer 601, 603, 605 and 607, a spacer layer 604, a first and a second electrolyte layer 602 and 606, and a first, a second, a third and a fourth transparent electrode 611 to 614. The first transparent electrode 611, the first information layer 601, the first electrolyte layer 602, the second information layer 603 and the second transparent electrode 612 form a first information stack. The third transparent electrode 613, the third information layer 605, the second electrolyte layer 606, the fourth information layer 607 and the fourth transparent electrode 614 form a second information stack. The two information stacks are separated by the spacer layer 604.

The information strip rolled up so as to obtain the information carrier of FIG. 6*b* comprises a first transparent electrode, a first information layer, an electrolyte layer, a second information layer, a second transparent electrode and a spacer layer. In this case, an information stack corresponds to a part of the information strip corresponding to a single turn of the winding process.

In order to address the first information layer 601, the first information layer 601 is made absorbent in that a suitable potential difference V1 is applied between the first transparent electrode 611 and the second transparent electrode 612. Then, in order to address the second information layer 603, the first information layer 601 is made transparent in that a reverse potential difference −V1 is applied between the first transparent electrode 611 and the second transparent electrode 612. As a consequence, the second information layer 603 becomes absorbent at the wavelength 1. Hence, the second information layer 603 is addressed and can be scanned.

Then, in order to address the third information layer 605, the second information layer 603 has to be made transparent, so that the scanning of the third information layer 605 is not perturbed by the second information layer 603. This cannot be done by application of a potential difference V1 between the first transparent electrode 611 and the second transparent electrode 612, because the first information layer 601 would become absorbent at the wavelength 1, thus perturbing the scanning of the third information layer 605. As a consequence, a potential difference different from V1 is applied between the first transparent electrode 611 and the second transparent electrode 612, at which potential difference the first information layer 601 and the second information layer 603 are both transparent. This is possible, because the absorption of certain electrochromic materials depends on the applied potential difference, as explained, for example, in "Electrochromism: Fundamentals and Applications", page 145. For example, a potential difference V1/2 may be applied. The potential difference to be applied in order to make the first and second information layers 601 and 603 transparent depends, inter alia, on the electrochromic material used.

The third information layer 605 is then addressed by application of a potential difference V2 between the third transparent electrode 613 and the fourth transparent electrode 614. In this example, V2 is equal to V1, because the electrochromic materials used in the information layers are the same. Then, in order to address the fourth information layer 607, a reverse potential difference −V2 is applied between the third transparent electrode 613 and the fourth transparent electrode 614.

Figure 6C:
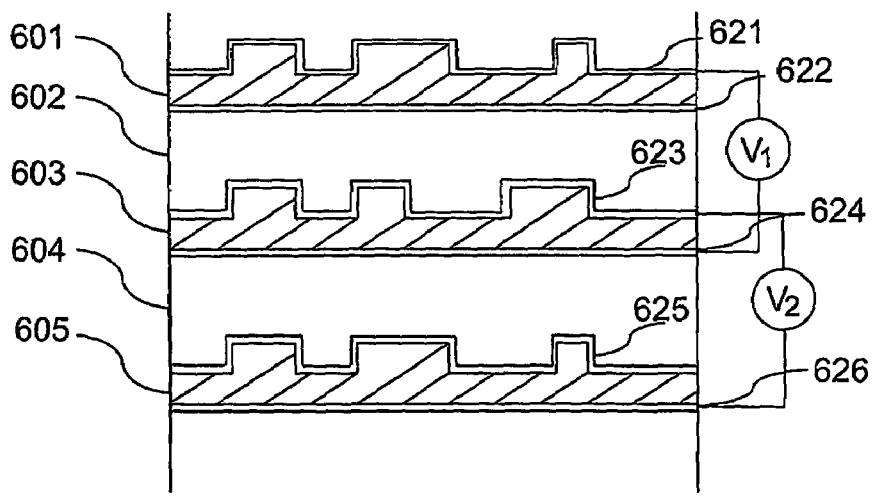

FIG. 6*c* shows a third ROM information carrier, wherein an information layer serves as counter electrode for another information layer. This information carrier comprises a first, a second and a third information layer 601, 603 and 605, a first and a second electrolyte layer 602 and 604, and a first, a second, a third, a fourth, a fifth and a sixth transparent electrode 621 to 626. The first transparent electrode 621, the first information layer 601, the first electrolyte layer 602, the second information layer 603 and the fourth electrode 624 form a first information stack. The third electrode 623, the second information layer 603, the second electrolyte layer 604, the third information layer 605 and the sixth electrode 626 form a second information stack. In this information carrier, the six electrodes 621 to 626 are porous, which means that ions from the electrolytes 602 and 604 can pass through these electrodes 621 to 626.

The information strip which is rolled up so as to obtain the information carrier of FIG. 6*c* comprises a first transparent electrode, an information layer, a second transparent electrode and an electrolyte layer. The electrolyte layer comprises an adhesive material. In this case, an information stack does not correspond to a part of the information strip corresponding to a single turn of the winding process, but is the combination of two parts of the information strip each corresponding to a single turn of the winding process.

In order to address the first information layer 601, the first information layer 601 is made absorbent in that a suitable potential difference V1 is applied between the first transparent electrode 621 and the fourth transparent electrode 624. As the second and third transparent electrodes 622 and 623 are porous, ions can flow between the first and second information layers 601 and 603, so that the electrochemical process can be performed.

Then, in order to address the second information layer 603, the first information layer is made transparent in that a reverse potential difference −V1 is applied between the first transparent electrode 621 and the fourth transparent electrode 624. As a consequence, the second information layer 603 becomes reduced, and hence becomes absorbent at the wavelength 1. Hence, the second information layer 603 is addressed and can be scanned.

In order to address the third information layer 605, a potential difference V2 is applied between the third transparent electrode 623 and the sixth electrode 626. This potential difference V2 is equal to −V1, as the electrochromic materials in the information layers 601, 603 and 605 are the same. The third information layer 605 is reduced and becomes absorbent at the wavelength 1, and the second information layer 603 is oxidized and becomes transparent at the wavelength 1. As a consequence, only the third information layer 605 is absorbent at the wavelength 1, so that the first and second information layers 601 and 603 do not perturb the scanning of the third information layer 605.

Figure 7:
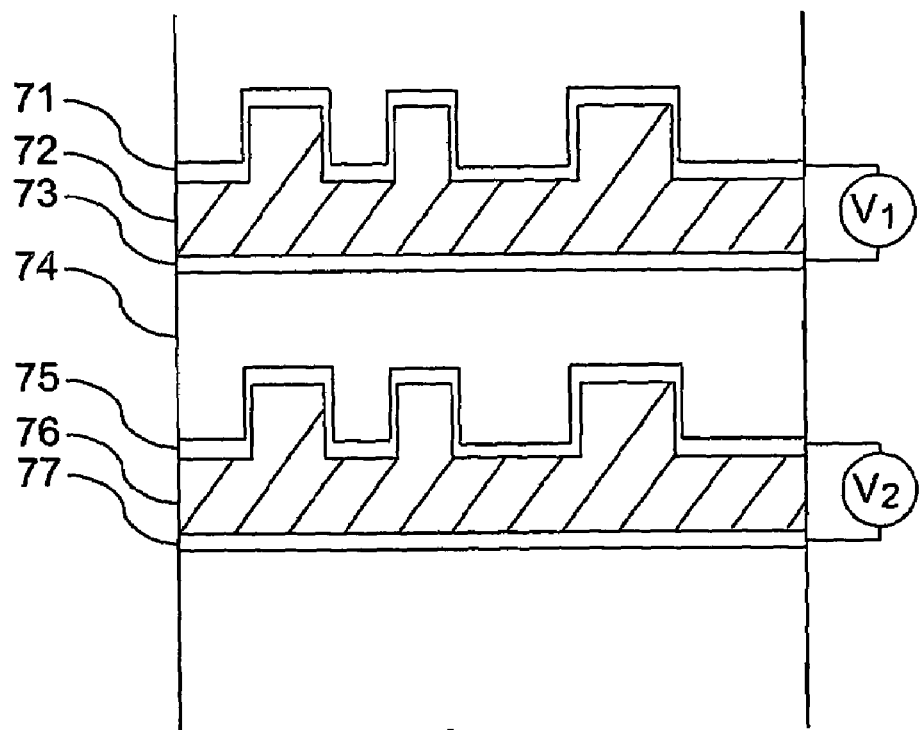
FIG. 7 shows a first ROM information carrier in accordance with a second embodiment of the invention.

FIG. 7 shows a first ROM information carrier in accordance with a second embodiment of the invention. Such an information carrier comprises a first, a second, a third and a fourth transparent electrode 71, 73, 75 and 77, a first and a second information layer 72 and 76 and a spacer layer 74. The first transparent electrode 71, the first information layer 72 and the second transparent electrode 73 form a first information stack, the third transparent electrode 75, the second information layer 76 and the fourth transparent electrode 77 form a second information stack. The two information stacks are separated by the spacer layer 74.

This information carrier is intended to be scanned by an optical beam, which has a wavelength 1. The first, second, third and fourth transparent electrodes 71, 73, 75 and 77 as well as the spacer layer 74, are chosen so as to be transparent at the wavelength 1.

An information layer of an information stack comprises molecules which can be rotated with respect to their initial orientation when a suitable potential difference is applied between the first and second electrodes. A DC voltage may be used to accomplish this, but preferably an AC voltage is used.

The information strip rolled up so as to obtain the information carrier of FIG. 7 comprises a first transparent electrode, an information layer, a second transparent electrode and a spacer layer. The information layer is patterned by conventional techniques such as embossing and printing.

Molecules having an ability to turn towards a given direction when a potential difference is applied between transparent electrodes are, for example, liquid crystal molecules. Such liquid crystal molecules are described, for example, in "Handbook of Liquid Crystal Research", by Peter J. Collings, Jay S. Patel, Oxford University Press, New York, 1997. For example, a suitable potential difference applied between the first and second transparent electrodes 71 and 73 creates an electric field, which has a direction substantially orthogonal to the first and second transparent electrodes 71 and 73. When subjected to this electric field, the liquid crystal molecules of the first information layer 72 will turn towards the direction of the electric field.

This is true when liquid crystal molecules having a positive dielectric anisotropy are used. Alternatively, liquid crystal molecules having a negative dielectric anisotropy may be used in accordance with the invention. In this case, the liquid crystal molecules of the first information layer 72 will turn towards a direction that is perpendicular to the direction of the electric field. The following description applies to liquid crystal molecules having a positive dielectric anisotropy.

Furthermore, an information layer may comprise a single type of liquid crystal molecules, or a mixture of two or more types of liquid crystal molecules. Moreover, an information layer may exhibit one or more temperature-dependent or concentration-dependent liquid crystal phases, such as a nematic phase, smectic phase, chiral nematic phase, ferroelectric phase or discotic phase.

Furthermore, an information layer may incorporate other components. For instance, the liquid crystal molecules may be incorporated within an isotropic or anisotropic network, as described, for example, in "Liquid crystals in complex geometries. Formed by polymer and porous networks", by R. A. M. Hikmet, edited by G. P. Crawford, S. Zumer, published by Taylor & Francis, London, 1996. Such a network-enforced liquid crystal layer may, for example, be created in-situ in that a previously applied reactive mixture is irradiated with UV-light, as is described in this reference.

When no potential difference is applied between the first and second transparent electrodes 71 and 73, the liquid crystal molecules of the first information layer 72 are randomly directed, so that the first information layer 72 is substantially transparent at the wavelength 1. When a suitable potential difference is applied between the first and second transparent electrodes 71 and 73, the liquid crystal molecules of the first information layer 72 will turn towards the direction of the electric field created by said potential difference, which results in the first information layer 72 becoming absorbent and/or reflective at the wavelength 1. This is a consequence of a change in index of refraction, which results from the re-orientation of the liquid crystal molecules of the first information layer 72.

The molecules used in accordance with the invention may alternatively be molecules comprising a charged substituent which turn towards the direction of a current created by the potential difference applied between two transparent electrodes. Examples of such molecules are ionomers and polyelectrolytes. Polyelectrolytes or ionomers are ion-containing polymers, consisting of polymeric backbones with a relatively small number of monomer units with an ionic functionality either as a pendant group or incorporated in the main chain. Mostly, structures with carboxylic, sulfonic, or phosphoric acids can be used, which are partly or fully neutralized with cations. These materials are described, for example, in "Ionic Polymers", by L. Holliday, Applied Science Publishers, London, 1975. Particular examples of these materials are, for example, poly(2-acrylamido-2-methylpropanesulphonic acid), poly(ethylene sulphonic acid), poly(styrene sulphonic acid), and zinc or sodium salts of copolymers such as poly(ethylene-co-methylacrylic acid).

Optionally, these polyelectrolytes or ionomers may be modified so as to comprise mesogenic units, present in the polymeric main-chain, side-chain or both. Specific examples of such liquid crystalline ionomers are described, for example, in "Liquid-crystalline ionomers", by Wilbert et al., Macromolecular Symposia (1997), 117 229–232.

Futhermore, optional additives such as solvent, co-solvent, or softening additives may be used along with the employed ionomers or polyelectrolytes in order to adjust the viscosity of the information layer, so as to facilitate and optimise the reorientation of the materials.

When no potential difference is applied between the first and second transparent electrodes 71 and 73, the molecules of the first information layer 72 are randomly directed, so that the first information layer 72 is substantially transparent at the wavelength 1. When a suitable potential difference is applied between the first and second transparent electrodes 71 and 73, the molecules of the first information layer 72 will turn towards the direction of the current created by said potential difference, which results in the first information layer 72 becoming absorbent and/or reflective at the wavelength 1.

This direction depends on the nature of the materials used in the first information layer 11. If the first information layer 11 only comprises charged substituents, this direction is the direction of the current created by said potential difference. If the information layer comprises charged substituents containing mesogenic units, the direction depends on the nature of the liquid crystal molecules of the mesogenic units.

The following description applies to information layers comprising liquid crystal molecules. A similar description applies to information layers comprising molecules with a charged substituent, optionally containing mesogenic units.

When the first information layer 72 is scanned for reading information from this first information layer 72, a potential difference V1 is applied between the first and second transparent electrodes 71 and 73. An electric field is thus created between the first and second transparent electrodes 71 and 73. As a result, the liquid crystal molecules of the first information layer 72 turn towards the direction of this electric field, i.e. a direction substantially orthogonal to the first and second transparent electrodes 71 and 73. As a consequence, the first information layer 72 becomes absorbent and/or reflective at the wavelength 1.

The potential difference V1 is chosen such that, when it is applied, the absorption and/or reflection of the first information layer 72 become relatively high at the wavelength 1. Then, once the absorption and/or reflection of the first information layer 72 have become high, information can be read from this information layer by conventional read-out techniques.

Once the information of the first information layer 72 has been read, the second information layer 76 is scanned. First, the first information layer 72 is made transparent in that the potential difference V1 is removed. The electric field between the first and second transparent electrodes 71 and 73 disappears, the liquid crystal molecules rotate back to their initial orientations and the first information layer 72 thus becomes transparent.

Then, the second information layer 76 is made absorbent and/or reflective, in that a potential difference V2 is applied between the third and fourth transparent electrode 75 and 77. In this example, V2 is equal to V1, because the first and second information stacks comprise the same liquid crystal molecules. If different molecules having an ability to turn towards a given direction are used in the first and second information layers 72 and 76, V2 may differ from V1. Also if the layer thicknesses of the information layers 72 and 76 are different, a different potential difference may be needed.

Once the second information layer 76 is absorbent and/or reflective, information can be read from this second information layer 76. The first information layer 72 does not perturb the read-out of information, because the first information layer 72 has been made transparent. As a consequence, it is possible to address only one information layer, while the rest of the information carrier is substantially transparent. The desired layer is addressed by application of the suitable potential differences between the transparent electrodes of the individual information stacks.

In the above description, the liquid crystal molecules are randomly oriented when no potential difference is applied between the first and second electrodes. When a potential difference is applied, they turn towards a direction, which is parallel or perpendicular to the electric field created by the potential difference, depending on the nature of the liquid crystal molecules.

It should be noted that the liquid crystal molecules may also be oriented in a certain direction when no potential difference is applied, this direction being changed when a potential difference is applied between the first and second electrodes. For example, the liquid crystal molecules may be parallel to the first and second electrodes when no potential difference is applied, assuming this orientation results in a transparent information layer. Then, when a voltage difference is applied, the liquid crystal molecules turn towards a direction perpendicular to the first and second electrodes, in which case the considered information layer becomes absorbent and/or reflective.

In the latter case, the liquid crystal molecules should return to their initial orientation when the potential difference is removed. This may be achieved by use of an anisotropic network for the information layer. For example, if the orientation of the liquid crystal molecules is planar when no potential difference is applied, i.e. parallel to the first and second electrodes, a planarly oriented anisotropic network will be used in combination with liquid crystal molecules having a positive dielectric anisotropy. If the orientation of the liquid crystal molecules is homeotropic when no potential difference is applied, i.e. perpendicular to the first and second electrodes, a homeotropically oriented anisotropic network will be used in combination with liquid crystal molecules having a negative dielectric anisotropy.

Alternatively, a chemical or mechanical modification of the first and second electrodes may be performed, in order to induce a preferred orientation of the liquid crystal alignment when no voltage is applied.

Alternatively, additional alignment layers that enclose the information layer may be used. An additional information layer is placed between an electrode and the information layer of an information stack. Both alignment layers are preferred, although it is also possible to use only one of these alignment layers.

Alignment layers typically used for the construction of conventional liquid crystal displays may be used here, such as rubbed polyimide alignment layers, or photoalignment layers, such as coumarin derivatives or cinnamate derivatives. These layers may again be deposited by conventional processing techniques, such as spin coating or dip coating. Depending on the type of alignment layer, subsequent rubbing is required or a brief UV-exposure, to induce the desired orientation. The used alignment layers enclosing the information layer are preferably the same, but may also be different. A benefit of the use of polyimides is their outstanding temperature stability, which is well above the typical degradation temperatures that are commonly observed for the majority of organic polymers.

Figure 8B:
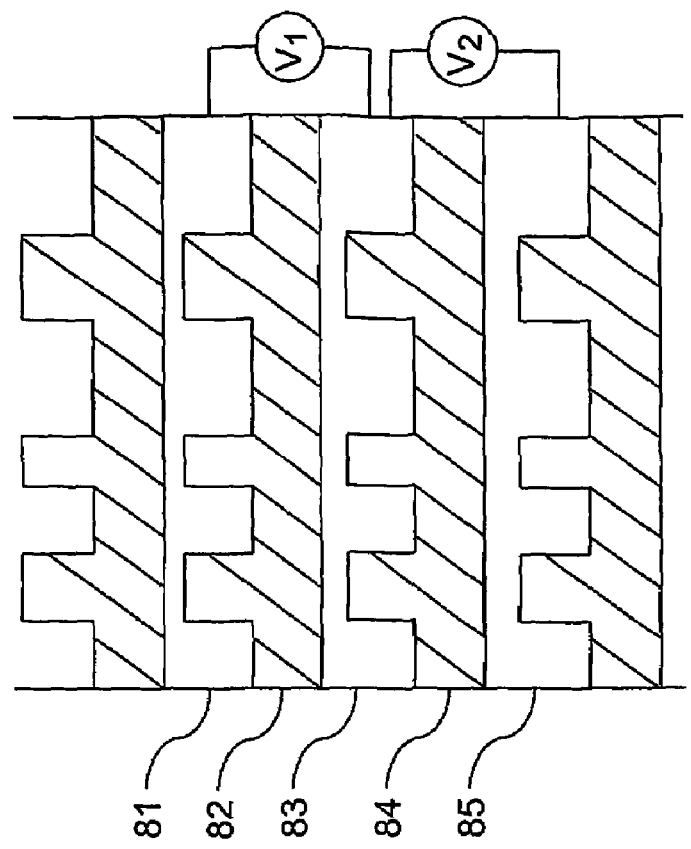
FIGS. 8a and 8b show a second and a third ROM information carrier in accordance with a second embodiment of the invention.
Figure 8A:
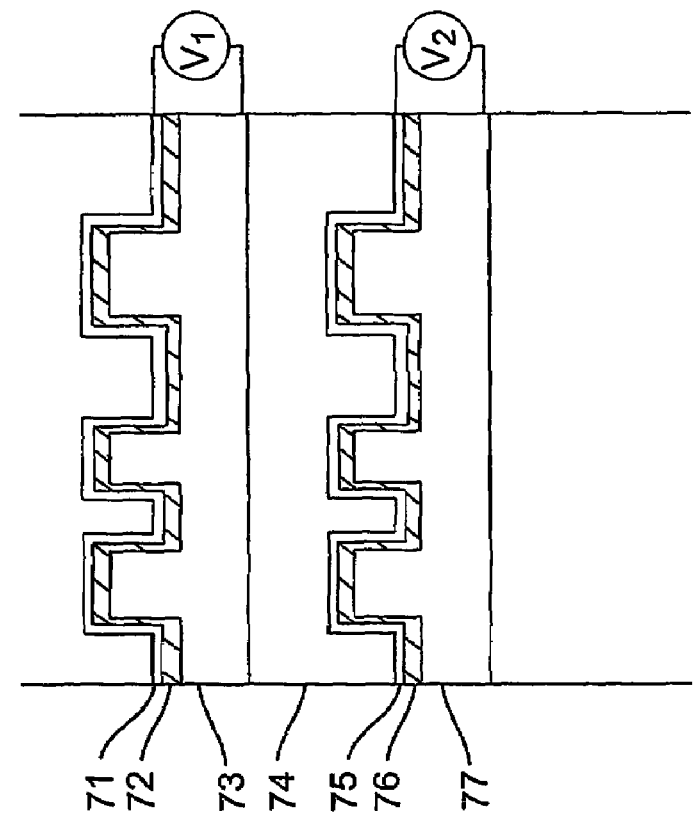

FIG. 8a shows a second ROM information carrier in accordance with a second embodiment of the invention. In this Figure, the numbers identical to numbers of FIG. 7 stand for the same entities. This information carrier comprises a first, a second, a third and a fourth transparent electrode 71, 73, 75 and 77, a first and a second information layer 72 and 76 and a spacer layer 74. The first transparent electrode 71, the first information layer 72 and the second transparent electrode 73 form a first information stack; the third transparent electrode 75, the second information layer 76 and the fourth transparent electrode 77 form a second information stack. The two information stacks are separated by the spacer layer 74.

The information strip rolled up so as to obtain the information carrier of FIG. 8a comprises a first transparent electrode, an information layer, a second transparent electrode and a spacer layer. The first transparent electrode is patterned by conventional techniques such as embossing, and the information layer is deposited on the patterned transparent electrode by conventional techniques such as vapour deposition.

In order to address the first and the second information layers 72 and 76, the potential differences are applied between the first and second transparent electrodes 71 and 73, and the third and fourth transparent electrodes 75 and 77, respectively.

FIG. 8b shows a third ROM information carrier in accordance with a second embodiment of the invention. This information carrier comprises a first, a second and a third transparent electrode 81, 83 and 85, and a first and a second information layer 82 and 84. The first transparent electrode 81, the first information layer 82 and the second transparent electrode 83 form a first information stack; the second transparent electrode 83, the second information layer 84 and the third transparent electrode 85 form a second information stack.

The information strip rolled up so as to obtain the information carrier of FIG. 8b comprises an information layer and a transparent electrode. The transparent electrode comprises an adhesive material. In this case, an information stack does not correspond to a part of the information strip corresponding to a single turn of the winding process, but is the combination of two parts of the information strip each corresponding to a single turn of the winding process.

In order to address the first and the second information layers 82 and 84, the potential differences are applied between the first and second transparent electrodes 81 and 83, and the second and third transparent electrodes 83 and 85, respectively.

Figure 9:
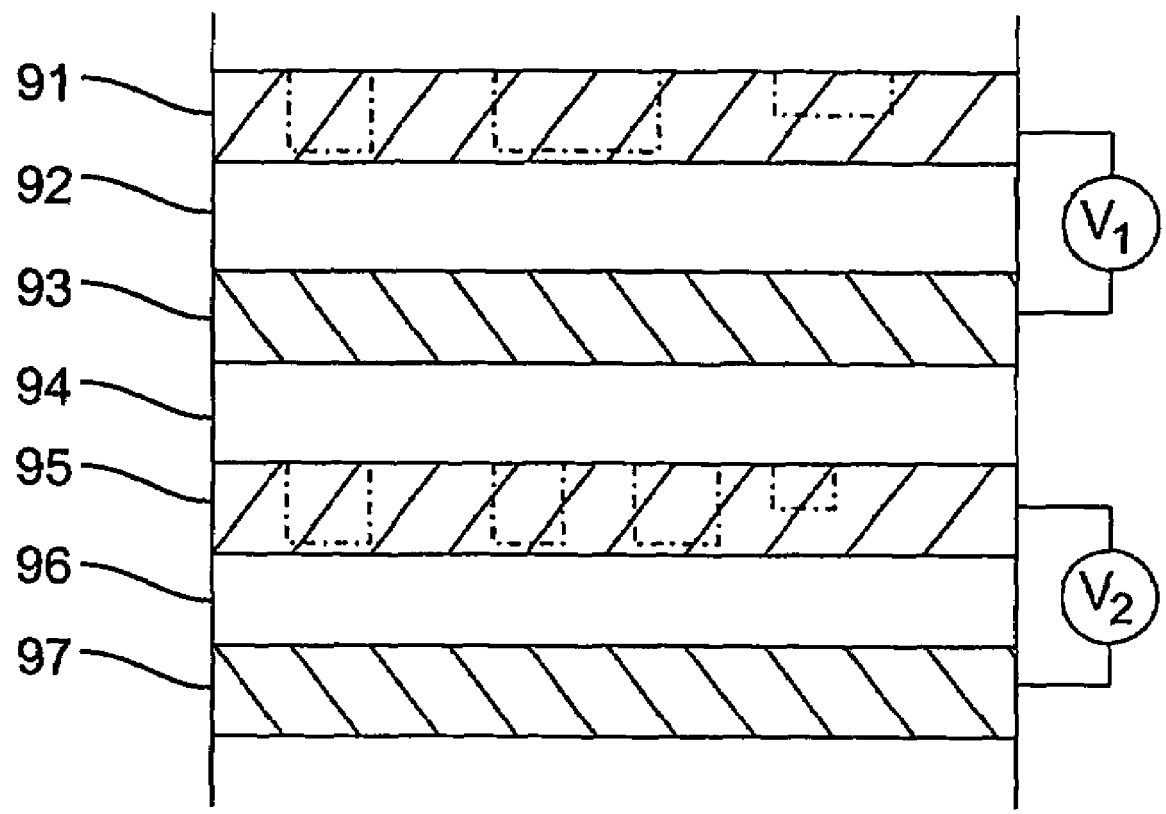
FIG. 9 shows a WORM information carrier in accordance with a first embodiment of the invention.

FIG. 9 shows a WORM (Write Once Read Many) information carrier in accordance with a first embodiment of the invention. This information carrier comprises a first information layer 91, a first electrolyte layer 92, a first counter electrode 93, a spacer layer 94 a second information layer 95, a second electrolyte layer 96 and a second counter electrode 97. The first information layer 91, the first electrolyte layer 92 and the first counter electrode 93 form a first information stack; the second information layer 95, the second electrolyte layer 96 and the second counter electrode 97 form a second information stack. The two information stacks are separated by the spacer layer 94.

The information strip rolled up so as to obtain the information carrier of FIG. 9 comprises a counter electrode, an electrolyte layer, an information layer and a spacer layer. The information layer comprises an electrochromic material having an ability to take up or release electrons, which ability can be locally reduced by means of the optical beam at the wavelength 1. In order to locally reduce the ability to take up or release electrons of the electrochromic materials, a relatively high power of the optical beam is required. The high power is absorbed in the material and changes its material properties, for example by melting, annealing, photochemical reactions, thermal damaging or deterioration. This relatively high power is used during writing of information on the information carrier, whereas a lower power is used during reading, the latter being insufficient for reducing the ability to take up or release electrons of the electrochromic materials.

In order to write information on the first information layer 91, the optical beam having the relatively high power is focused on the first information layer 91, in order to locally reduce the ability to take up or release electrons of the electrochromic material, for writing marks. In FIG. 9, the marks where the ability to take up or release electrons of the electrochromic material has been reduced are represented by dotted lines. The depth of the marks in the information layers can be chosen in that the power of the optical beam is varied, or the time during which the optical beam is focused on a mark is varied. Having different mark depths allows multi-level recording. In single-level recording, typically two reflection states or levels are used, whereas in the case of multi-level recording, more reflection levels are defined to represent data.

In order to write information on the second information layer 95, the optical beam having the relatively high power is focused on the second information layer 95, in order to locally reduce the ability to take up or release electrons of the electrochromic material, for writing marks.

The information layer on which information is to be written may be made absorbent before the relatively high power optical beam is focused on it. This improves absorption of the relatively high power optical beam, which increases the reduction of the ability to take up or release electrons of the electrochromic material.

In order to read information from the first information layer 91, this first information layer 91 is made absorbent at the wavelength 1, in that a suitable voltage V1 is applied between the first information layer 91 and the first counter electrode 93. The first information layer 91 becomes absorbent, except where marks have been written, because the ability to take up or release electrons of these marks is too small for allowing a reduction of the electrochromic material of these marks. Hence, the difference in absorption and reflection between the marks and the non-marked areas in the first information layer 91 is used for reading information from the first information layer 91.

In order to read information from the second information layer 95, the first information layer 91 is made transparent at the wavelength 1, in that a reverse voltage −V1 is applied between the first information layer 91 and the first counter electrode 93. The entire first information layer 91, including the marks, is made transparent thereby. Hence, the first information layer 91 does not perturb the scanning of the second information layer 95. Then, the second information layer 95 is made absorbent at the wavelength 1, in that a suitable voltage V2, equal to V1, is applied between the second information layer 95 and the second counter electrode 97. The second information layer 95 becomes absorbent, except where marks have been written. Information can then be read from the second information layer 95.

It is important to note that information layers with electrochromic material having an ability to take up or release electrons which can be locally reduced by means of the optical beam at the wavelength 1 may be used in cooperation with additional electrodes, such as described with reference to FIGS. 5a to 5c. It should also be noted that these information layers may also be used in information carriers such as described in FIG. 6a to 6c, where an information layer serves as counter electrode for another information layer.

It should also be noted that information layers with electrochromic material having an ability to take up or release electrons which can be locally reduced by means of the optical beam may further comprise a fluorescent material. In this case, the electrochromic material and the fluorescent material may be the same material. Examples of fluorescent electrochromic materials are aminonaphtylethenylpyridinium-dyes, RH-dyes, carbocyanine derivatives and rhodamine derivatives.

Alternatively, information layers may be used, which comprise an electrochromic material and a fluorescent material having an ability to emit light by fluorescence, which ability can be locally reduced by means of the optical beam. In this case, in order to write information on the first information layer 91, the optical beam with wavelength 11, having the relatively high power, is focused on the first information layer 91, in order to locally reduce the ability to emit light by fluorescence of the fluorescent material, for writing marks. The same process applies for writing information on the second information layer 95.

The information layer on which information is to be written may be made absorbent before the relatively high power optical beam is focused thereon. This improves absorption of the relatively high power optical beam, which increases the reduction of the ability to emit light by fluorescence of the fluorescent material.

In order to read information from the first information layer 91, this first information layer 91 is made absorbent at the wavelength 11, in that a suitable voltage V1 is applied between the first information layer 91 and the first counter electrode 93. The first information layer 91 becomes absorbent, but a fluorescence signal is generated only when the optical beam is focused on a non-marked area. This property is used for reading information from the first information layer 91.

It is important to note that the first and second information layers 91 and 95 may comprise an electrochromic material having an ability to take up or release electrons which can be locally reduced by means of the optical beam at the wavelength 11, and a fluorescent material having an ability to emit light by fluorescence, which can be locally reduced by means of the optical beam at the wavelength 11. During writing, the relatively high power optical beam is used for locally reducing the ability to take up or release electrons of the electrochromic material and the ability to emit light by fluorescence of the fluorescent material.

Figure 10B:
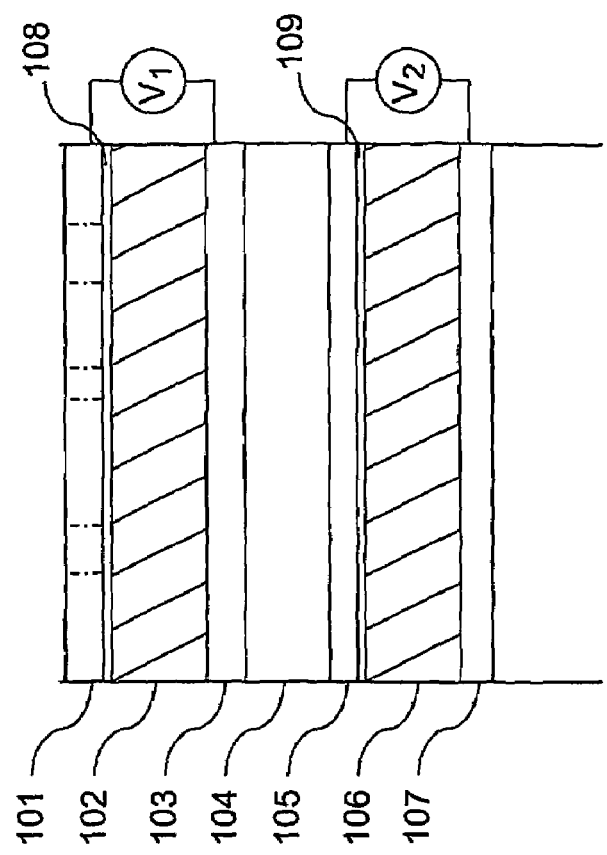
Figure 10A:
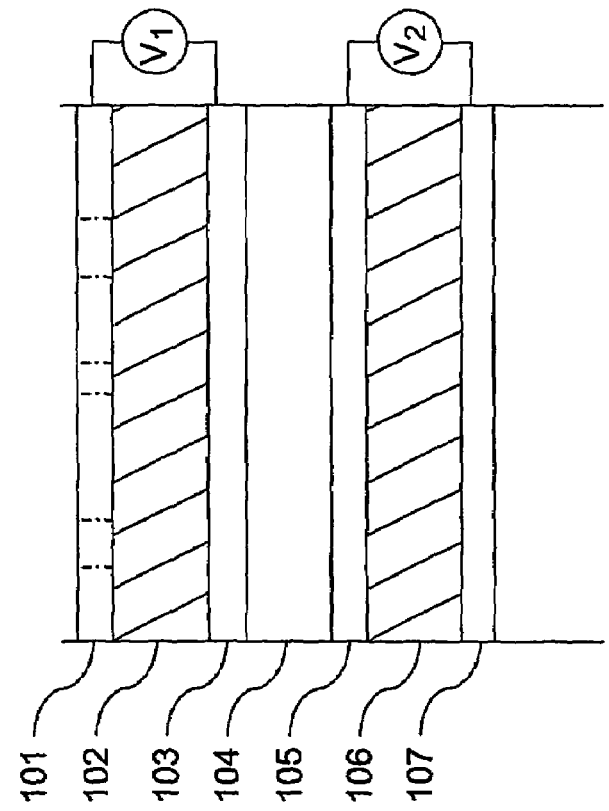

FIG. 10a shows a first WORM information carrier in accordance with a second embodiment of the invention. This information carrier comprises a first, a second, a third and a fourth transparent electrode 101, 103, 105 and 107, a first and a second information layer 102 and 106 and a spacer layer 104. The first transparent electrode 101, the first information layer 102 and the second transparent electrode 103 form a first information stack; the third transparent electrode 105, the second information layer 106 and the fourth transparent electrode 107 form a second information stack. The two information stacks are separated by the spacer layer 104.

The information strip rolled up so as to obtain the information carrier of FIG. 10a comprises a first transparent electrode, an information layer, a second transparent electrode and a spacer layer. The information layer comprises molecules intended to turn towards a direction substantially orthogonal to the first and second transparent electrodes when a suitable potential difference is applied between the first and second transparent electrodes. The first transparent electrode has an electrical conductance which can be locally reduced by means of the optical beam at the wavelength 1. In order to locally reduce the electrical conductance of the first transparent electrode, a relatively high power of the optical beam is required. The high power is absorbed in the material and changes the material properties thereof, for example by melting, annealing, photochemical reactions, thermal damaging or deterioration. This relatively high power is used during writing of information on the information carrier, whereas a lower power is used during reading, which power is not able to reduce the electrical conductance of the first transparent electrode.

In order to write information on the first information layer 102, the optical beam having the relatively high power is focused on the first transparent electrode 101, in order to locally reduce the electrical conductance of this first transparent electrode 101, for writing marks. In FIG. 3a, the marks where the electrical conductance of the first transparent electrode 101 has been reduced are represented by dotted lines.

In order to write information on the second information layer 106, the optical beam having the relatively high power is focused on the third transparent electrode 105, in order to locally reduce the electrical conductance of this third transparent electrode 105.

In order to read information from the first information layer 102, a suitable voltage V1 is applied between the first transparent electrode 101 and the second transparent electrode 103. An electric field is created between the first and second transparent electrodes 101 and 103, except where marks have been written, because the electrical conductance of these marks is to small for generating an electric field. Hence, the liquid crystal molecules of the first information layer 102 are subjected to an electric field, except in the parts located under the marks written in the first transparent electrode 101. As a consequence, the first information layer 102 becomes absorbent and/or reflective, except in the parts located under the written marks.

The difference in absorption and reflection between the parts under the marks and the parts under the non-marked areas is thus used for reading information from the first information layer 102.

In order to read information from the second information layer 106, the first information layer 102 is made transparent at the wavelength 1, in that the potential difference V1 is removed. The entire first information layer 102 is made transparent thereby. Hence, the first information layer 102 does not perturb the scanning of the second information layer 106. Then, the second information layer 106 is made absorbent and/or reflective at the wavelength 1, in that a suitable voltage V2, equal to V1, is applied between the third transparent electrode 105 and the fourth transparent electrode 107. The second information layer 106 becomes absorbent and/or reflective, except in the parts located under the marks written in the third transparent electrode 105. Information can then be read from the second information layer 106.

It should be noted that the thicknesses of the layers as compared with the mark width represented in FIG. 10a do not necessarily correspond to reality. Actually, it is advantageous that the thickness of an information layer is smaller than the width of a mark. Actually, if the thickness of an information layer is greater than the width of a mark, an electric field may be created even in parts located under marks. Hence, the parts where the liquid crystal molecules are subjected to an electric field may be larger than desired, thus reducing the data capacity of such an information carrier. For optical recording, the marks are typically larger than 500 nanometres. As a consequence, a thickness of the information layer smaller than 300 nanometres is preferred, in order to avoid the creation of an electric field in a part located under a written mark.

It should also be noted that the information layer preferably has a decomposition temperature which is higher than the temperature at which the electrical conductance of the first transparent electrode is reduced. Actually, even if the optical beam is not directly focused on the information layer during writing, the information layer reaches a temperature which is not far from the temperature of the transparent electrode in which marks are written.

However, an information layer having a decomposition temperature lower than the temperature at which the electrical conductance of the first transparent electrode is reduced may be used in a WORM information carrier in accordance with a second embodiment of the invention, as shown in FIG. 10b. In FIG. 10b, the information carrier further comprises a first and a second thermal insulation layer 108 and 109, which are placed between the first transparent electrode 101 and the first information layer 102, and between the third transparent electrode 105 and the second information layer 106, respectively.

The information strip rolled up so as to obtain the information carrier of FIG. 10b comprises a first transparent electrode, an information layer, a thermal insulation layer, a second transparent electrode and a spacer layer.

The first and second thermal insulation layers 108 and 109 are chosen so as to be transparent at the wavelength 1, and to have a decomposition temperature higher than the temperature at which the electrical conductance of the first and third transparent electrodes 101 and 105 is reduced. For example, a ZnS—SiO2 layer may be used as the thermal insulation layer, as well as high-temperature resistant polymers, such as polyimides, polyetherimides, polyesterimides, polyamidimides, polyamides, polymetylpentene, polyetheretherketone, and polyethersulfone. The first and second thermal insulation layers 108 and 109 have a relatively low thermal conductivity. As a consequence, the temperature of the first and second information layers 102 and 106 during writing is lower than the temperature of the first and third transparent electrodes 101 and 105. Hence, the first and second information layers 102 and 106 can have a relatively low decomposition temperature.

FIG. 10c shows a third WORM information carrier in accordance with a second embodiment of the invention. Compared with the WORM information carrier of FIG. 10a, this information carrier further comprises a first, a second, a third and a fourth additional electrode 1010 to 1013. The additional electrodes serve to overcome the local increase in electrical resistance when the first and third electrodes 101 and 105, in which marks are written, are partially degraded. Organic conducting polymers with a high degradation temperature or inorganic layers such as ITO (Indium-Tin-Oxide) may be used as additional electrodes.

FIG. 10d shows a fourth WORM information carrier in accordance with a second embodiment of the invention. This information carrier comprises a first, a second, a third and a fourth electrode 101, 103, 105 and 107, a first and a second information layer 102 and 106 and a spacer layer 104. The first electrode 101, the first information layer 102 and the second electrode 103 form a first information stack; the third electrode 105, the second information layer 106 and the fourth electrode 107 form a second information stack. The two information stacks are separated by the spacer layer 104.

The information layers can be locally degraded, e.g. annealed, altered, molten, fixed, degraded, crystalized, or photochemically deteriorated by means of an optical beam. In order to locally degrade the first and second information layers 102 and 106, a relatively high power of the optical beam is required. The high power is absorbed in the material and changes its material properties, for example by melting, annealing, photochemical reactions, thermal damaging or deterioration. This relatively high power is used during writing of information on the information carrier, whereas a lower power is used during reading, which lower power is not able to degrade or alter the first and second information layers 102 and 106.

A local degradation of an information layer of an information stack has the result that the molecules in a degraded area lose their ability to rotate when a potential difference is applied between the first and second electrodes of this information stack. Hence, degraded areas remain transparent, whatever the potential difference applied between the first and second electrodes of this information stack.

In order to write information on the first information layer 102, the optical beam having the relatively high power is focused on the first information layer 102, in order to locally degrade this first information layer 102, for writing marks. In FIG. 10d, the marks where the first information layer 102 has been degraded are represented by dotted lines. The depth of the marks in the information layers can be chosen in that the power of the optical beam is varied, or the time during which the optical beam is focused on a mark is varied. Having different mark depths allows multilevel recording. In single-level recording, typically two reflection states or levels are used, whereas more reflection levels are defined to represent data in the case of multi-level recording.

In order to write information on the second information layer 106, the optical beam having the relatively high power is focused on the second information layer 106, in order to locally degrade this second information layer 106, for writing marks.

The information layer on which information is to be written may be made absorbent before the relatively high power optical beam is focused thereon. This improves absorption of the relatively high power optical beam, which increases the local degradation of the information layer.

In order to read information from the first information layer 102, this first information layer 102 is made absorbent at the wavelength 1, in that a suitable voltage V1 is applied between the first electrode 101 and the second electrode 103. The first information layer 102 becomes absorbent and or/reflective, except where marks have been written, because the molecules of these marks cannot rotate. Hence, the difference in absorption and/or reflection between the marks and the non-marked areas in the first information layer 102 is used for reading information from the first information layer 102.

In order to read information from the second information layer 106, the first information layer 102 is made transparent at the wavelength 1, in that the potential difference V1 is applied between the first electrode 101 and the second electrode 103. The entire first information layer 102, including the marks, is made transparent thereby. Hence, the first information layer 102 does not perturb the scanning of the second information layer 106. Then, the second information layer 106 is made absorbent and/or reflective at the wavelength 1, in that a suitable voltage V2, equal to V1, is applied between the third electrode 105 and the fourth electrode 107. The second information layer 106 becomes absorbent and/or reflective, except where marks have been written. Information can then be read from the second information layer 106.

FIG. 11a shows a first RW (ReWritable) information carrier in accordance with a first embodiment of the invention. This information carrier comprises a first information layer 111, a first electrolyte layer 112, a first counter electrode 113, a spacer layer 114 a second information layer 115, a second electrolyte layer 116 and a second counter electrode 117. The first information layer 111, the first electrolyte layer 112 and the first counter electrode 113 form a first information stack; the second information layer 115, the second electrolyte layer 116 and the second counter electrode 117 form a second information stack. The two information stacks are separated by the spacer layer 114.

The information strip rolled up so as to obtain the information carrier of FIG. 11a comprises a counter electrode, an electrolyte layer and an information layer. The information layer comprises an electrochromic material. The information layer may also comprise a fluorescent material. The electrolyte layer has a temperature-dependent mobility threshold. This means that below this threshold the mobility of ions within this electrolyte layer is low, whereas ion mobility is high above this threshold. Examples of such electrolyte layers are a polymeric matrix having a suitable glass transition, non-covalently bonded aggregates that show a suitable temperature dependent equilibrium between an aggregated and a free form, and a polymeric matrix having a relatively strong temperature-dependent viscosity.

In order to write a mark on the first information layer 111, the optical beam is focused on this mark. The electrolyte layer under this mark is heated, and the temperature of the electrolyte layer under this mark exceeds the mobility threshold. A suitable potential difference V1 is applied between the first information layer 111 and the first counter electrode 113. As the ion mobility is low where the optical beam is not focused, the electrochromic process takes place only where the ion mobility is high, i.e. where a mark is to be written. As a consequence, the first information layer 111 becomes absorbent only where the optical beam is focused, and a mark is written where this optical beam is focused. Then the optical beam is focused on a location where another mark is to be written on the first information layer 111. When the potential difference V1 is subsequently cut, the written marks remain absorbent, because of the bistability of the electrochromic material. The same process is repeated in order to write marks on the second information layer 115.

The electrolyte layers are chosen so as to have a decomposition temperature which is lower than the temperature-dependent mobility threshold. In that case, the information layers are not degraded during writing, which means that the writing process is reversible.

In order to read information from the first information layer 111, the optical beam is focused on this information layer, and the difference in absorption between the marks and the non-marked area is used for read-out. No potential difference is needed between the first information layer 111 and the first counter electrode 113, as the marks remain absorbent without any potential difference being applied. The same process is repeated in order to read information from the second information layer 115.

The information written on the information layers of this information carrier can be erased, and information can be rewritten on these information layers. In order to erase information written from the first information layer 111, this first information layer 111 is scanned by a relatively high power optical beam. The first electrolyte layer 112 is heated, and the temperature of the first electrolyte layer 112 exceeds the mobility threshold. A potential difference −V1 is applied between the first information layer 111 and the first counter electrode 113. As a consequence, the written marks become oxidized and hence transparent. The whole first information layer 111 thus becomes transparent, and marks can then be rewritten on this first information layer 111, as described above. The same process is repeated in order to erase information written on the second information layer 115.

It is important to note that it is possible to design a WORM information carrier with the information carrier of FIG. 11a, for example, by use of an electrochromic material which exhibits an irreversible transition, i.e. which cannot be reduced once it has been oxidized, or vice-versa. Examples of electrochromic materials which exhibit an irreversible transition are methylene red, methylene orange and erioglaucine. It is also possible to prevent the user from applying a reverse potential difference, so that the written data cannot be erased. Such a limitation may be included, for example, in a lead-in part of the information carrier.

In the example described above, the first information layer 111 interferes with the read-out of the second information layer 115, because it comprises absorbent marks, which interact with the optical beam. Actually, in order to enable read-out of information written on the information layers, the absorption of the marks has to be relatively high. For example, an absorption of 20 percent is required for the written marks. For a filling ratio of 0.25, this leads to an absorption of an information layer of about 5 percent. The filling ratio is the ratio between the marks and the non-marked area. If the information carrier comprises a high number of information layers, the read-out of the deepest information layers is perturbed by the presence of the information layers located above the deepest layers. As a consequence, the number of layers is limited to about 20 in this case.

In order to increase the number of layers of such a RW information carrier, the information layers further comprise a thermochromic material having temperature-dependent optical properties at the wavelength of the optical beam.

In this case, information is written as described above, but the electrochromic material and the potential differences are chosen such that the absorption of the written marks is relatively low, for example 2 percent. In order to read information from the first information layer 111, the optical beam is focused on this information layer 111. As the written marks have a non-zero absorption, the optical beam is absorbed, and the written marks of the first information layer 111 are heated. The temperature of the written marks reaches a threshold above which the absorption of the thermochromic material at the wavelength 1 becomes relatively high. Hence, the absorption of the written marks becomes sufficiently high to enable read-out of information from the first information layer 111. The same process is repeated for reading information from the second information layer 115. During read-out of information from the second information layer 115, the optical beam is focused on the second information layer 115. Hence, the written marks of the first information layer 111 are not heated, and the absorption of these written marks remains relatively low. As a consequence, read-out of the second information layer 115 is much less perturbed by the first information layer 111, if the information layers comprise a thermochromic material. The number of information layers may thus be increased with the use of a thermochromic material.

The thermochromic material may be mixed with the electrochromic material in the information layer. It is also possible to add a layer in each information stack, which layer comprises a thermochromic material and is adjacent to the layer comprising the electrochromic material. In this case, the information layer is the combination of the layer comprising the electrochromic material and the layer comprising the thermochromic material.

FIG. 11b shows a second RW information carrier in accordance with the invention. In this Figure, numbers identical to numbers of FIG. 11a stand for the same entities. This information carrier further comprises a first photoconductive layer 118, a first working electrode 1100, a second photoconductive layer 119 and a second working electrode 1101. The first working electrode 1100 and the first photoconductive layer belong to the first information stack, the second working electrode 1101 and the second photoconductive layer 119 belong to the second information stack. The first and second working electrodes 1100 and 1101 are chosen to be transparent at the wavelength 1.

The information strip rolled up so as to obtain the information carrier of FIG. 11a comprises a counter electrode, an electrolyte layer, an information layer, a photoconductive layer and a working electrode. A photoconductive layer allows a transfer of electrons between the working electrode and the information layer of its information stack, when illuminated at the wavelength of the optical beam.

In the information carrier of FIG. 11a, writing of a mark requires focusing of the optical beam on this mark during a relatively long time. During this relatively long time, the heat generated by the optical beam can diffuse into the electrolyte layer, thus leading to a larger mark than desired, because the ion mobility of the electrolyte layer is increased to a larger area than desired. As a consequence, only relatively large marks can be written, which leads to a relatively low data capacity per information layer.

In order to solve this problem, each information stack comprises a photoconductive layer, which allows a transfer of electrons between the working electrode and the information layer of its information stack, only when it is illuminated at the wavelength 1.

In order to write a mark on the first information layer 111, the optical beam is focused on this mark. As a consequence, only the part located above this mark is illuminated at the wavelength 1. Hence, the electrochromic process can only take place in this mark, because the absorption of electrons is enabled only in this mark. The electrolyte layer under this mark is heated, and the temperature of the electrolyte layer under this mark exceeds the mobility threshold. A suitable potential difference V1 is applied between the first working electrode 1100 and the first counter electrode 113. As a consequence, the first information layer 111 becomes absorbent only where the optical beam is focused, and a mark is written where this optical beam is focused. The same process is repeated for writing marks on the second information layer 115.

Figure 12:
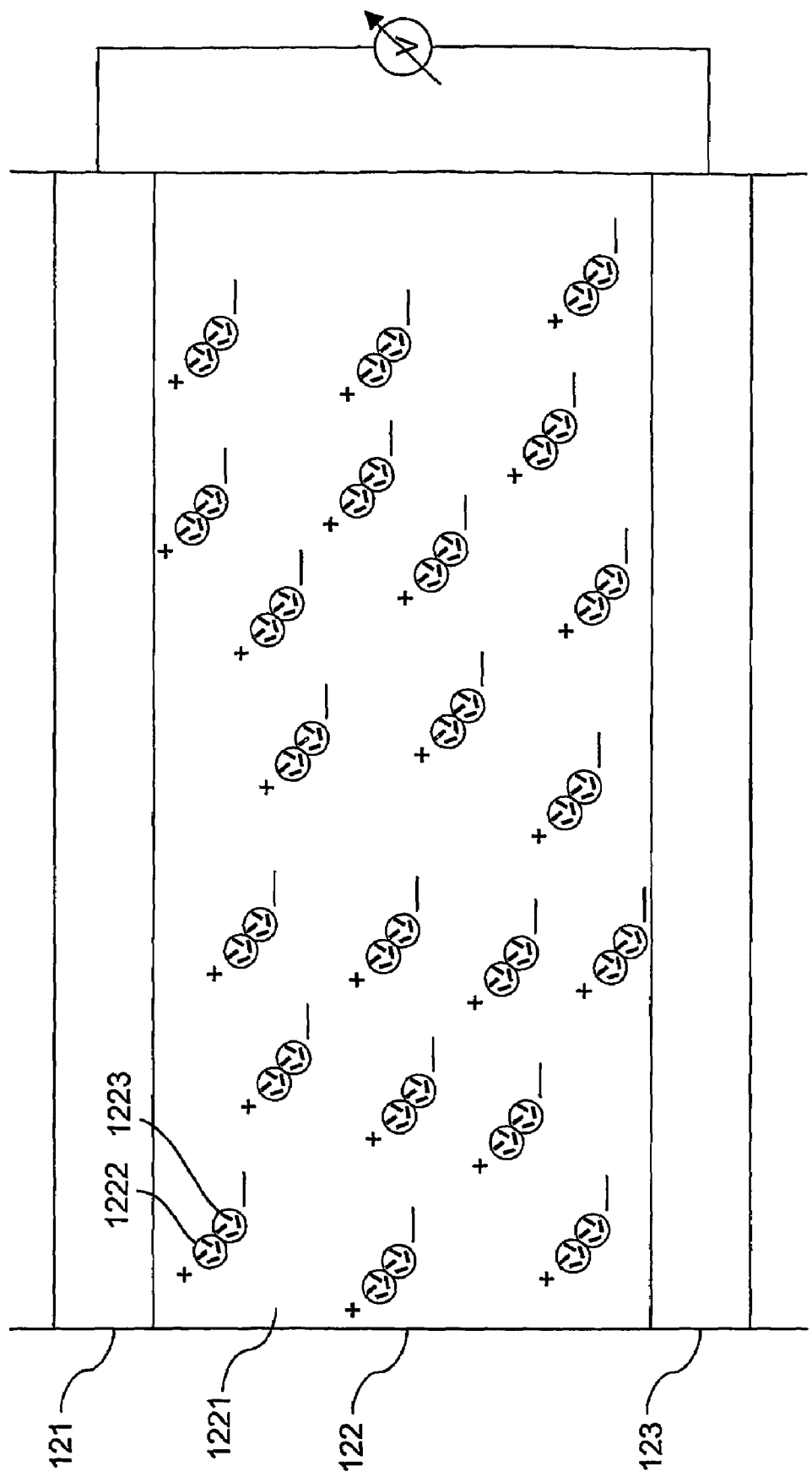
FIG. 12 shows a structure of an unwritten information layer in a RW information carrier in accordance with a second embodiment of the invention.

FIG. 12 shows a structure of an unwritten information layer in a RW information carrier in accordance with a second embodiment of the invention. FIG. 12 only shows one information stack of the information carrier, the other information stacks being similar. This information stack comprises a first and a second transparent electrode 121 and 123, and an information layer 122. The information layer comprises a matrix 1221 and surface-charged colloidal particles, such as particles 1222 and 1223. The surface-charged colloidal particles are represented by spheres, and comprise liquid crystal molecules, represented by short rods. The representation by rods does not limit the use of liquid crystals to be calamitic, but also banana-shaped or discotic liquid crystals may be used. The matrix 1221 has a viscosity which can be locally reduced by means of the relatively high power optical beam at the wavelength 1, in order to write information on the information layer 122. During read-out of information, an optical beam having a lower power is used, which cannot reduce the viscosity of the matrix 1221. The matrix 1221 is chosen to be transparent at the wavelength 1.

The matrix 1221 may consist of a material having a temperature-dependent transition, which may be a first order transition, a second order transition, or a glass transition. Preferably, this transition will be situated well above ambient temperature, and well above the typical upper limit handling temperature of the information carrier, but below the degradation temperature of adjacent layers within the information carrier. The matrix may furthermore have an inorganic nature, but preferably has an organic nature, such as polymeric nature. In particular, a polymeric matrix may consist, for example, of homopolymers, copolymers or polymer blends. Examples of polymers having a temperature-dependent transition, such as a glass transition, are polystyrene and polymethylmethacrylate.

A method of obtaining liquid crystal molecules embedded in charged colloidal particles is known to those skilled in the art. For example, encapsulated liquid crystals are known from the display-related polymer dispersed liquid crystal (PDLC) switches, as described, for example, in "Liquid crystal dispersions", by P. S. Drzaic, World Scientific, Singapore, 1995. However, the position of the liquid crystal droplets is fixed by the usually crosslinked matrix. The synthesis and use of separately encapsulated liquid crystals, or liquid crystal microcapsules, that can subsequently be dispersed in a matrix has been described in, for example, S.-A. Cho, N.-H. Park, J.-W. Kim, K.-D. Suh, Colloids and surfaces, A: Physicochemical and engineering aspects, 196, 217 (2002).

Various liquid crystal molecules may be used in an information carrier as depicted in FIG. 12. For example, liquid crystal molecules having a positive or negative dielectric anisotropy may be employed. Also, the type of liquid crystal molecules may be chosen from, for example, calamitic, banana-shaped, and discotic types.

The information strip rolled up so as to obtain the information carrier of FIG. 12 comprises a first transparent electrode, an information layer comprising a matrix and surface-charged colloidal particles, and a second transparent electrode.

When the information layer 122 is unwritten, the surface-charged colloidal particles are randomly dispersed in the matrix 1221. As is shown in FIG. 12, the positively surface-charged colloidal particles may cluster with the negatively surface-charged particles in order to form stable aggregates.

In this situation, the information layer 122 is substantially transparent at the wavelength 1, whatever the potential difference applied between the first and second transparent electrodes 121 and 123. Actually, the surface-charged particles comprising liquid crystal molecules are colloidal, which means that the volume fraction of surface-charged particles with respect to the volume of the matrix 1221 is relatively small. For example, this volume fraction is lower than 10 percent. Preferably, this volume fraction is lower than 5%. It is also possible to use liquid molecules in the positively surface-charged particles different from those in the negatively surface-charged particles to enhance the contrast of the recorded information layer.

In order to write a mark on the information layer 122, the relatively high power optical beam is focused on this mark. The part of the matrix 1221 located under this mark is heated, and reaches a temperature at which its viscosity is reduced. A suitable potential difference V1 is applied between the first and second transparent electrodes 121 and 123, which creates an electric field in the information layer 122, thus separating the negatively charged colloidal particles from the positively charged colloidal particles. A written information layer is thus obtained, which is shown in FIG. 13.

Figure 13:
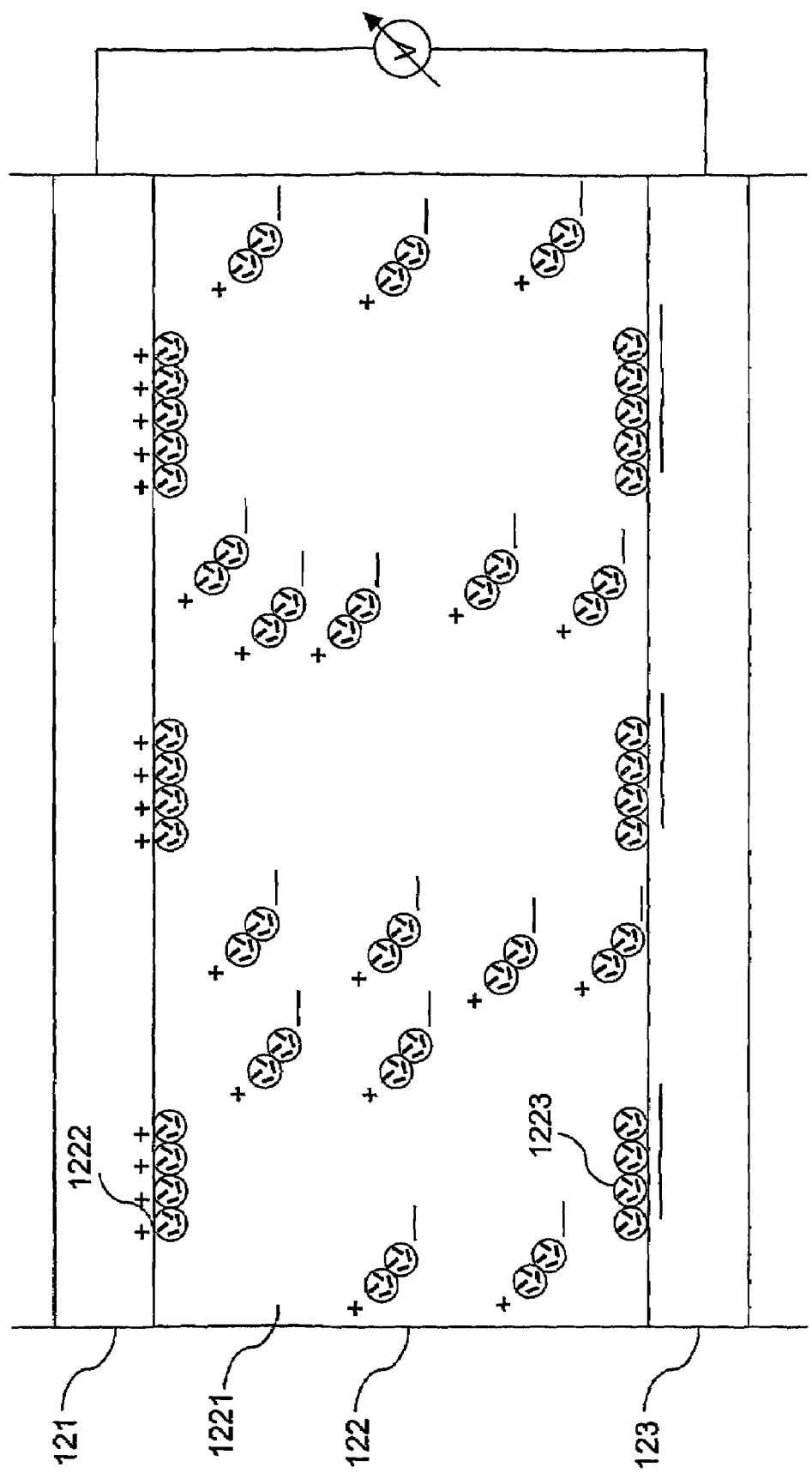
FIG. 13 shows a structure of a written information layer in a RW information carrier in accordance with a second embodiment of the invention.

FIG. 13 shows the structure of a written RW (ReWritable) information carrier in accordance with the invention. In this Figure, numbers which are identical to numbers of FIG. 12 stand for the same entities.

In the parts of the information layer 122 where a mark has been written, the positively surface-charged particles are captured at the surface of the negative transparent electrode, which is, in this case, the first transparent electrode 121, and the negatively surface-charged particles are captured at the surface of the positive transparent electrode, which is, in this case, the second transparent electrode 123. Once a mark has been written, the relatively high power optical beam is not focused on this mark. Hence, the part of the matrix 1221 located under this written mark cools down while the potential difference is maintained during cooling down, and the surface-charged particles remain at the surface of the transparent electrode, because the viscosity of the matrix 1221 prevents the transport of these surface-charged particles.

As a consequence, once information has been recorded on the information layer 122, this first information layer 122 comprises written parts, where surface-charged particles are captured at the surface of the first and second transparent electrodes 121 and 123, and unwritten parts, where the surface-charged particles are randomly dispersed in the matrix 1221.

In order to read information from the information layer 122, the low power optical beam is focused on this information layer, and a suitable potential difference V2 is applied between the first and second transparent electrodes 121 and 123. The potential difference V2 may differ from V1. Actually, the potential difference V1 is used for enabling transport of the charged particles in the matrix 1221, whereas the potential difference V2 is used for rotating the liquid crystal molecules.

As explained in the description of FIG. 12, the unwritten parts of the information layer 122 remain transparent, even if the liquid crystal molecules in these unwritten part are subjected to an electric field, because the volume fraction of charged particles with respect to the volume of the matrix 1221 is relatively small. However, the written parts of the information layer 122 become absorbent and reflective at the wavelength 1 when the potential difference V2 is applied between the first and second transparent electrodes 121 and 123, because of the relatively high concentration of liquid crystal molecules in a small volume, i.e. near the first transparent electrode 121, which molecules all are turned towards the same direction. As a consequence, the difference of absorption and/or reflection between the unwritten parts and the written parts of the information layer 122 can be used for read-out.

When another information layer of the information carrier is scanned, the information layer 122 is made transparent, in that the potential difference V2 is removed.

The information written on the information layers of the information carrier shown in FIGS. 12 and 13 can be erased, and information can be rewritten on these information layers. In order to erase information written on the information layer 122, this information layer 122 is scanned by a relatively high power optical beam. The matrix 1221 is heated, and the viscosity of this matrix 1221 is reduced. A reverse potential difference −V3 is applied between the first and second transparent electrodes 121 and 123, in order to enable transport of the charged colloidal particles in a direction opposite to the transport direction obtained during writing. The amplitude of the potential difference −V3, and the time during which the reverse potential −V3 is applied between the first and second transparent electrodes 121 and 123, are chosen so as to obtain an information layer 122 as described in FIG. 12, in which the surface-charged colloidal particles are randomly dispersed in the matrix 1221. Marks can then be rewritten on this information layer 122, as described above.

It is important to note that it is possible to design a WORM information carrier with the information carrier of FIGS. 12 and 13. This is possible, for example, in that the user is prevented from applying a reverse potential difference, so that the written data cannot be erased. Such a limitation may be included, for example, in a lead-in area of the information carrier.

It should also be noted that multi-level recording is possible in an information carrier as depicted in FIGS. 12 and 13. By use of different times during which the potential difference V1 is applied between the first and second electrodes 121 and 123, different concentrations of positively surface-charged particles captured at the surface of the negative electrode 121 and negatively surface-charged particles captured at the surface of the positive electrode 43 can be obtained.

Figure 14:
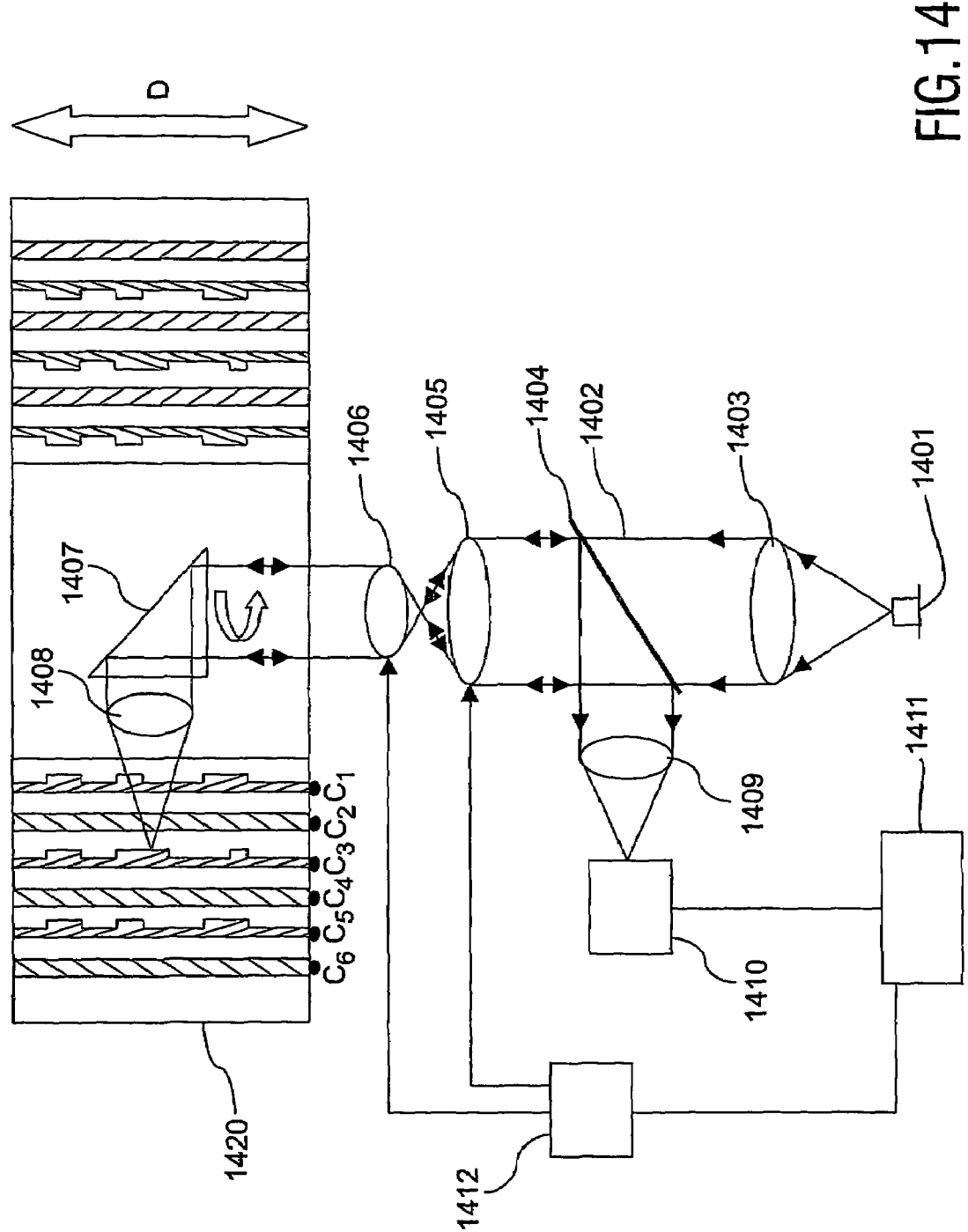
FIG. 14 shows an optical device in accordance with the invention.

FIG. 14 shows an optical device in accordance with the invention. Such an optical device comprises a radiation source 1401 for producing an optical beam 1402, a collimator lens 1403, a beam splitter 1404, a first correcting lens 1405, a second correcting lens 1406, a mirror 1407, an objective lens 1408, a servo lens 1409 for servo and data detection, detecting means 1410, measuring means 1411 and a controller 1412. This optical device is intended for scanning an information carrier 1420 in accordance with the invention. The information carrier 1420 comprises three information stacks and six contacts C1 to C6.

The optical device comprises a cavity or receptacle, whose shape is arranged for receiving the information carrier 1420. The mirror 1407 and the objective lens 1408 are mounted so that they can rotate together inside the cavity. The mirror 1407 and the objective lens 1408 are focusing means. When the information carrier 1420 is inserted into the optical scanning device, the focusing means are placed inside the central hole of the information carrier 1420.

During a scanning operation, which may be a writing operation or a reading operation, the information carrier 1420 is scanned by the optical beam 1402 produced by the radiation source 1401. The optical beam 1402 is focused on an information layer of the information carrier 1420, by means of the collimator lens 1403, the first and second correcting lenses 1405 and 1406, the mirror 1407 and the objective lens 1408.

During a scanning operation, a focus error signal or a tracking error signal may be detected, corresponding to a positioning error of the optical beam 1402 on the information layer. This focus error signal and the tracking error signal may be used in order to correct the axial position of the first and second correcting lenses 1405 and 1406, so as to compensate for a focus error or a tracking error of the optical beam 1402. A signal is sent to the controller 1412, which drives an actuator in order to move the first or the second correcting lens 1405 or 1406 axially or radially.

The error signals and the data written on the information layer are detected by the detecting means 1410. The optical beam 1402, reflected by the information carrier 1420, reaches the servo lens 1409, via the objective lens 1408, the mirror 1407, the second correcting lens 1406, the first correcting lens 1405 and the beam splitter 1404. This reflected beam then reaches the detecting means 1410. If the information stacks further comprise a fluorescent material, the detecting means 1410 may comprise means for separating the fluorescence signal coming from the addressed layer from the fluorescence signals coming from the non-addressed layers. For example, a confocal pinhole is arranged in front of a photodiode in order to spatially block the fluorescence signal coming from the non-addressed layers. However, such means for separating the fluorescence signal coming from the addressed layer from the fluorescence signals coming from the non-addressed layers are usually not necessary in an optical scanning device in accordance with the invention, because it is only the addressed layer that emits light by fluorescence in the information carriers in accordance with the invention.

The following description applies to an information carrier 1420 as depicted in FIGS. 3a and 3b, i.e. wherein an information stack comprises an information layer and a counter electrode, the potential differences being applied between the information layer and the counter electrode. The description is similar for information carriers as depicted in the other Figures.

In order to address an information layer of an information stack of the information carrier 1420, this layer is made absorbent and reflective in that a potential difference is applied between the contacts which are electrically connected to the information layer and the counter electrode of this information stack. The optical device comprises means for applying a potential difference between two contacts. In the example of FIG. 14, a potential difference is applied between contacts C3 and C4, in order to address the corresponding information layer.

Once this information layer is addressed, the optical beam 1402 is focused on this information layer, and information can be read. The information carrier 1420 is scanned in a helical way. The information layer comprises a plurality of tracks, each track corresponding to a complete revolution of the focusing means. Once a particular track has been read, another track of the same information layer can be read in that the information carrier 1420 is translated in an axial direction, i.e. the direction D indicated in FIG. 14. Alternatively, the focusing means may be translated inside the central hole of the information carrier 1420. In this case, the information carrier 1420 is fixed in the optical scanning device.

In this example, only the mirror 1407 and the objective lens 1408 are mounted with rotation possibility inside the cavity of the optical scanning device. It should be noted that other elements of the optical scanning device may be rotationally mounted inside this cavity, for example, the first and second correcting lenses 1405 and 1406 can be thus mounted inside said cavity.

It is important to note that, in order to scan a particular information layer, all the other information layers of the information carrier 1420 do not necessarily need to be transparent. For example, in order to scan the information layer adjacent to the central hole of the information carrier 1420, the other information layers can be absorbent, because the optical beam 1402 does not pass through these information layers. This is advantageous, because in this case, when a next information layer is scanned, this next information layer is already absorbent. As a consequence, this next information layer can be scanned without waiting for it to become absorbent.

It should be noted that the fact that the information carrier cannot rotate, but only the focusing means, is particularly advantageous. Actually, the size and weight of the focusing means are relatively small compared with the size of, for example, a conventional CD or DVD. As a consequence, the rotational speed of the focusing means can be higher than the rotational speed of a conventional CD or DVD. Hence, the data transfer rate is higher in an optical scanning device in accordance with the invention than in a conventional CD or DVD player/recorder.

It should be noted that a counterweight may be included in the focusing means, in order to compensate for the high centrifugal force caused by the high rotational speed.

It should be noted that in another embodiment, the signal corresponding to information written in the information carrier 1420 can be detected in transmission by a second objective lens which is placed outside the information carrier 1420, and which can rotate around the information carrier 1420 such that the optical beam 1402 transmitted through an information layer reaches this second objective lens.

It should also be noted that in another embodiment, the information carrier 1420 may have a mirror at the back of the whole carrier, which mirror reflects the beam transmitted through all information stacks, including the addressed one. In this case, the optical scanning device as shown in FIG. 14 may be used to read the data. For example, the protective layer 17 of FIG. 1 may comprise a reflective surface.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. An information carrier (1420) for scanning information by means of an optical beam (1402) having a wavelength, said information carrier comprising a central hole (11) and at least two information stacks roll up around said hole, wherein each information stack comprises a first electrode, a second electrode and a material whose optical properties at the wavelength of the optical beam depend on a potential difference applied between the first and second electrodes.

2. An information carrier as claimed in claim 1, said information carrier comprising an electrolyte layer (32) between the first and the second electrode, the first electrode being an information layer (31) comprising an electrochromic material, the second electrode being a counter electrode (33).

3. An information carrier as claimed in claim 2, wherein an information layer serves as counter electrode for another information layer.

4. An information carrier as claimed in claim 2, wherein the electrochromic material (91) has an ability to take up or release electrons, which ability can be locally reduced by means of the optical beam in order to write information on the information layer.

5. An information carrier as claimed in claim 2, wherein the electrolyte layer (112) has a temperature-dependent mobility threshold.

6. An information carrier as claimed in claim 5, wherein the information layer further comprises a thermochromic material having temperature-dependent optical properties at the wavelength of the optical beam.

7. An information carrier as claimed in claim 5, wherein an information stack further comprises a photoconductive layer (118) for allowing a transfer of electrons in the information layer when illuminated at the wavelength of the optical beam.

8. An information carrier as claimed in claim 2, wherein the information layer (41) further comprises a fluorescent material.

9. An information carrier as claimed in claim 8, wherein the fluorescent material has an ability to emit light by fluorescence, which ability can be locally reduced by means of the optical beam in order to write information on the information layer.

10. An information carrier as claimed in claim 1, said information carrier comprising an information layer (72) between the first and second electrodes (71, 73), wherein the information layer comprises molecules which can be rotated when a suitable potential difference is applied between the first and second electrodes.

11. An information carrier as claimed in claim 10, wherein said molecules are liquid crystal molecules which can be rotated when subjected to an electric field created by the potential difference applied between the first and second electrodes.

12. An information carrier as claimed in claim 10, wherein said molecules comprise a charged substituent which can be rotated when subjected to a current created by the potential difference applied between the first and second electrodes.

13. An information carrier as claimed in claim 10, wherein the first electrode (101) has an electrical conductance which can be locally reduced by means of an optical beam in order to write information on the information layer.

14. An information carrier as claimed in claim 13, wherein the information stack further comprises a thermal insulation layer (108) between the first electrode and the information layer.

15. An information carrier as claimed in claim 10, wherein the information layer can be locally degraded by means of an optical beam in order to write information on the information layer.

16. An information carrier as claimed in claim 10, wherein the information layer (122) comprises a matrix (1221) comprising two types of surface-charged colloidal particles, one with negative charge and one with positive charge (1222, 1223), said charged colloidal particles comprising liquid crystal molecules, said matrix having a viscosity which can be locally reduced by means of an optical beam in order to write information on the information layer.

17. An optical scanning device for scanning an information carrier (1420) by means of an optical beam (1402) having a wavelength, said information carrier comprising a central hole (11) and at least two information stacks roll up around said hole, wherein each information stack comprises a first electrode, a second electrode and a material whose optical properties at the wavelength of the optical beam depend on a potential difference applied between the first and second electrodes, said optical scanning device comprising means for receiving said information carrier, means (1401) for generating the optical beam, means for applying a potential difference between the first and the second electrode of an information stack, means for focusing (1407, 1408) said optical beam on an information layer, said focusing means being mounted with rotation possibility inside said receiving means.

18. An optical scanning device as claimed in claim 17, wherein said focusing means are mounted with translation possibility inside said cavity.

19. A method of manufacturing an information carrier, said method comprising the steps of manufacturing an information strip comprising at least one electrode and a material whose optical properties at the wavelength of the optical beam depend on a potential difference applied between two electrodes, winding said information strip around a transparent hollow element (12) and cutting the electrode at each turn in the winding step.

20. A method of manufacturing an information carrier as claimed in claim 19, said method further comprising a step of writing information on the information strip.

* * * * *